United States Patent
Dunlop et al.

(10) Patent No.: US 9,405,976 B2
(45) Date of Patent: Aug. 2, 2016

(54) SYSTEMS AND METHODS FOR SEMANTICALLY CLASSIFYING AND NORMALIZING SHOTS IN VIDEO

(71) Applicant: TiVo Inc., Alviso, CA (US)

(72) Inventors: Heather Dunlop, Raleigh, NC (US); Matthew Berry, Raleigh, NC (US)

(73) Assignee: TiVo Inc., Alviso, CA (US)

( * ) Notice: Subject to any disclaimer, the term of this patent is extended or adjusted under 35 U.S.C. 154(b) by 0 days.

(21) Appl. No.: 14/829,593

(22) Filed: Aug. 18, 2015

(65) Prior Publication Data

US 2015/0356354 A1    Dec. 10, 2015

Related U.S. Application Data

(60) Continuation of application No. 13/438,435, filed on Apr. 3, 2012, now Pat. No. 9,111,146, which is a division of application No. 12/372,561, filed on Feb. 17, 2009, now Pat. No. 9,311,344.

(60) Provisional application No. 61/029,042, filed on Feb. 15, 2008.

(51) Int. Cl.
| | |
|---|---|
| G06K 9/34 | (2006.01) |
| G06K 9/62 | (2006.01) |
| G06K 9/00 | (2006.01) |
| G06K 9/52 | (2006.01) |
| G06T 7/00 | (2006.01) |

(52) U.S. Cl.
CPC ........ *G06K 9/00751* (2013.01); *G06K 9/00718* (2013.01); *G06K 9/52* (2013.01); *G06T 7/0097* (2013.01)

(58) Field of Classification Search
None
See application file for complete search history.

(56) References Cited

U.S. PATENT DOCUMENTS

| | | | | |
|---|---|---|---|---|
| 7,194,134 | B2 | 3/2007 | Bradshaw | |
| 7,394,947 | B2* | 7/2008 | Li | G06K 9/6297 382/228 |
| 7,555,165 | B2* | 6/2009 | Luo | G06K 9/00664 382/165 |
| 7,941,009 | B2 | 5/2011 | Li et al. | |
| 8,189,114 | B2* | 5/2012 | Petersohn | G06K 9/00765 348/135 |
| 8,238,719 | B2* | 8/2012 | Chen | G06F 17/30843 386/278 |

(Continued)

OTHER PUBLICATIONS

Israel et al., "Automating the construction of scene classifiers for content-based video retrieval", MDM/KDD '04, Aug. 2004.*

(Continued)

*Primary Examiner* — Soo Jin Park
(74) *Attorney, Agent, or Firm* — Wong & Rees LLP

(57) ABSTRACT

The present disclosure relates to systems and methods for classifying videos based on video content. For a given video file including a plurality of frames, a subset of frames is extracted for processing. Frames that are too dark, blurry, or otherwise poor classification candidates are discarded from the subset. Generally, material classification scores that describe type of material content likely included in each frame are calculated for the remaining frames in the subset. The material classification scores are used to generate material arrangement vectors that represent the spatial arrangement of material content in each frame. The material arrangement vectors are subsequently classified to generate a scene classification score vector for each frame. The scene classification results are averaged (or otherwise processed) across all frames in the subset to associate the video file with one or more predefined scene categories related to overall types of scene content of the video file.

27 Claims, 14 Drawing Sheets

VIDEO CLASSIFICATION SYSTEM OVERVIEW

(56) References Cited

U.S. PATENT DOCUMENTS

| | | | | |
|---|---|---|---|---|
| 8,311,344 B2* | 11/2012 | Dunlop | ............. | G06K 9/00664 382/224 |
| 8,396,286 B1 | 3/2013 | Aradhye et al. | | |
| 8,428,345 B2 | 4/2013 | Ma et al. | | |
| 8,494,259 B2 | 7/2013 | Aguilar et al. | | |
| 8,548,249 B2 | 10/2013 | Kashima et al. | | |
| 9,020,263 B2* | 4/2015 | Dunlop | ............. | G06K 9/00684 382/173 |
| 9,111,146 B2* | 8/2015 | Dunlop | ............. | G06K 9/00718 |
| 2006/0036948 A1* | 2/2006 | Matsuzaka | ............. | G11B 27/28 715/723 |
| 2007/0110308 A1* | 5/2007 | Hwang | ............. | G06K 9/00664 382/170 |
| 2007/0217676 A1* | 9/2007 | Grauman | ............. | G06K 9/4671 382/170 |
| 2008/0162561 A1* | 7/2008 | Naphade | ........... | G06F 17/30802 |
| 2009/0208106 A1 | 8/2009 | Dunlop et al. | | |
| 2012/0243740 A1 | 9/2012 | Aragon | | |
| 2013/0259390 A1 | 10/2013 | Dunlop et al. | | |
| 2014/0321746 A9 | 10/2014 | Dunlop et al. | | |

OTHER PUBLICATIONS

Fan et al., "Hierarchical classification for automatic image annotation", SIGIR '07, Jul. 2007.*

Naphade et al., "A probabilistic framework for semantic video indexing, filtering, and retrieval", IEEE Transactions on Multimedia, vol. 3, No. 1, Mar. 2001.*

Yanagawa et al., "Columbia University's baseline detectors for 374 LSCOM semantic visual concepts", Columbia University ADVENT Technical Report #222-2006-8, Mar. 20, 2007.*

United States Patent and Trademark Office, U.S. Appl. No. 13/438,395, Final Office Action dated Feb. 24, 2014.

United States Patent and Trademark Office, U.S. Appl. No. 13/438,435, Non-Final Office Action dated Apr. 1, 2014.

United States Patent and Trademark Office, U.S. Appl. No. 13/438,395, Notice of Allowance dated Aug. 14, 2014.

United States Patent and Trademark Office, U.S. Appl. No. 13/438,395, Notice of Allowance dated Dec. 1, 2014.

United States Patent and Trademark Office, U.S. Appl. No. 13/438,435, Notice of Allowance dated Dec. 19, 2014.

United States Patent and Trademark Office, U.S. Appl. No. 13/438,435, Notice of Allowance dated Apr. 9, 2015.

Bosch et al., "Segmentation and description of natural outdoor scenes", Image and Vision Computing, dated 2006.

Cao et al., "Spatially Coherent latent topic model for concurrent segmentation and classification of objects and scenes", ICCV, 2007.

Israel et al., "Automating the construction of scene classifiers for content-based video retrieval", MDM/KDD, 2004.

* cited by examiner

VIDEO CLASSIFICATION SYSTEM OVERVIEW

OVERALL CLASSIFICATION SYSTEM

EXEMPLARY VIDEO FRAME INCLUDING
LABELED MATERIALS

INTENSITY CLASSIFICATION

INDOOR/OUTDOOR CLASSIFICATION

OUTDOOR CLASSIFICATION

SEGMENT COMBINATION/MERGING PROCESS

EXEMPLARY HIERARCHY OF MATERIAL CLASSIFIERS

MATERIAL ARRANGEMENT VECTOR
GENERATION PROCESS

VIDEO FILE CLASSIFICATION
(PREDEFINED SHOT)

VIDEO FILE CLASSIFICATION
(SHOT DETECTION)

VIDEO CLASSIFICATION SYSTEM COMPONENTS

| Predicted class | miscellaneous | 2 | 2 | 7 | 2 | 4 | 4 | 0 | 0 | 2 | 5 | 0 | 21 |
|---|---|---|---|---|---|---|---|---|---|---|---|---|---|
| | water | 1 | 1 | 1 | 11 | 1 | 2 | 2 | 25 | 1 | 1 | 77 | 1 |
| | vehicle | 4 | 0 | 2 | 2 | 0 | 0 | 0 | 1 | 0 | 46 | 0 | 9 |
| | trees/bushes | 5 | 11 | 7 | 2 | 15 | 2 | 1 | 0 | 79 | 3 | 0 | 7 |
| | snow/ice | 0 | 0 | 0 | 2 | 0 | 4 | 0 | 45 | 1 | 1 | 5 | 1 |
| | sky/clouds | 5 | 0 | 3 | 0 | 0 | 3 | 95 | 13 | 2 | 0 | 6 | 5 |
| | sand/gravel | 1 | 6 | 1 | 9 | 17 | 57 | 0 | 2 | 0 | 1 | 3 | 2 |
| | rock | 3 | 4 | 3 | 3 | 55 | 13 | 0 | 5 | 5 | 6 | 1 | 13 |
| | road/sidewalk | 3 | 1 | 2 | 65 | 1 | 4 | 1 | 6 | 1 | 3 | 4 | 1 |
| | person | 4 | 1 | 71 | 1 | 2 | 1 | 0 | 1 | 1 | 13 | 1 | 16 |
| | grass | 0 | 73 | 1 | 0 | 2 | 6 | 0 | 0 | 4 | 0 | 2 | 1 |
| | building | 69 | 1 | 4 | 3 | 1 | 3 | 1 | 2 | 3 | 21 | 1 | 23 |
| | | building | grass | person | road/sidewalk | rock | sand/gravel | sky/clouds | snow/ice | trees/bushes | vehicle | water | miscellaneous |
| | True class | | | | | | | | | | | | |

CONFUSION MATRIX FOR OUTDOOR MATERIAL CLASSIFICATION RESULTS

PRECISION-RECALL CURVE OF SCENE CLASSIFICATION RESULTS

SYSTEMS AND METHODS FOR SEMANTICALLY CLASSIFYING AND NORMALIZING SHOTS IN VIDEO

PRIORITY CLAIM

Incorporation by Reference

This application is a continuation of U.S. patent application Ser. No. 13/438,435, filed Apr. 3, 2012, which is a divisional of U.S. patent application Ser. No. 12/372,561, filed Feb. 17, 2009, now U.S. Pat. No. 8,311,344, which claims the benefit of U.S. Provisional Patent Application No. 61/029,042, filed Feb. 15, 2008, the entire contents of each is hereby incorporated by reference as if fully set forth herein, under 35 U.S.C. §120. The applicant(s) hereby rescind(s) any disclaimer of claim scope in the parent application(s) or the prosecution history thereof and advise(s) the USPTO that the claims in this application may be broader than any claim in the parent application(s).

TECHNICAL FIELD

The present systems and methods relate generally to classification of video data, files, or streams, and more particularly to semantic classification of shots or sequences in videos based on video content for purposes of content-based video indexing and retrieval, as well as optimizing efficiency of further video analysis.

BACKGROUND

Image classification systems (i.e. systems in which the content of a single image or photograph is analyzed to determine an appropriate label or descriptor for the image) are known in the art. Such systems are generally used to label or classify images according to predefined textual descriptors. Typically, an image classification system analyzes an image via the use of one or more "classifier" algorithms (described in greater detail below) that identify a predefined label that matches or partially matches an image based on the image content and associate the identified label with the image. For example, an image of a horse on a farm may be labeled "horse," or "farm," or both. In some systems, an image or photo may be labeled according to broad categories of image content (e.g. indoor or outdoor, city or landscape, etc.), whereas other systems utilize more narrow categories (e.g. desert, ocean, forest, car, person, etc.). Some systems even classify images based on identified persons in the image (e.g. celebrities, political figures, etc.), objects in the image, etc. These labels or classifications are useful for a variety of purposes, such as association with metadata tags or other identification mechanisms for use in image indexing and retrieval systems, surveillance and security systems, and other similar image recognition purposes.

Such image classification systems utilize a variety of methods to classify images, with varying results. One such technique involves examining the power spectrum of an image in conjunction with Principal Components Analysis (PCA) to identify the type of content in the image, as described in A. Torralba and A. Oliva, Statistics of Natural Image Categories, Network: Computation in Neural Systems, vol. 14, pp. 391-412 (2003). Other approaches include using a "bag of words" with Scale Invariant Feature Transform (SIFT) descriptors (see P. Quelhas and J. Odobez, Natural Scene Image Modeling Using Color and Texture Visterms, Conference on Image and Video Retrieval (CIVR), Phoenix Ariz. (2006)) in combination with Latent Dirichlet Allocation (see L. Fei-Fei and P. Perona, A Bayesian Hierarchical Model for Learning Natural Scene Categories, IEEE Conference on Computer Vision and Pattern Recognition (2005)), probabilistic Latent Semantic Analysis (see A. Bosch et al., Scene Classification Via pLSA, ECCV (4), pp. 517-30 (2006)), or a spatial pyramid (see S. Lazebnik et al., Beyond Bags of Features: Spatial Pyramid Matching for Recognizing Natural Scene Categories, IEEE Conference on Computer Vision and Pattern Recognition, vol. 2, pp. 2169-78 (2006)).

Additional approaches to image classification include using a Two-Dimensional (2D) hidden Markov model (see J. Li and J. Z. Wang, Automatic Linguistic Indexing of Pictures by a Statistical Model Approach, IEEE Transactions on Pattern Analysis and Machine Intelligence, vol. 25, no. 10 (2003)), as well as a wavelet coefficients representation of features with hierarchical Dirichlet process hidden Markov trees (see J. J. Kivinen et al., Learning Multiscale Representations of Natural Scenes Using Dirichlet Processes, IEEE 11.sup.th International Conference on Computer Vision (2007)). Still further image classification systems divide an image into a rectangular grid and classify the proportion of "material" (i.e. category of content) in each grid cell (see, e.g., J. Shotton et al., Semantic Texton Forests for Image Categorization and Segmentation, IEEE Computer Vision and Pattern Recognition (2008); J. Vogel and B. Schiele, Natural Scene Retrieval Based on a Semantic Modeling Step, Conference on Image and Video Retrieval (CIVR) (2004); etc.). In these systems, the occurrence of each material over the image is computed and the image is classified based on the resulting material occurrence vector.

Regardless of the specific approach, conventional image classification systems are ill-equipped to classify videos or portions of videos. Conventional systems are designed to analyze individual images in which care is taken to carefully frame the subject of the image (i.e. the scene) in a clear manner, whereas videos typically include a variety of types of images or frames, many of which are blurry or contain occluded portions. Additionally, the features used in single-image classification systems are often designed for narrow and particular purposes, and are unable to identify and classify the wide array of content present in most videos. Further, even if conventional systems were able to classify images from a video, these systems include no defined mechanism to account for the presence of a multitude of scene types across a video or portion of video (i.e. identification or classification of a single image or frame in a video does not necessarily indicate that the entire shot within the video from which the frame was extracted corresponds to the identified image class). As used herein, a "shot" defines a unit of action in a video filmed without interruption and comprising a single camera view.

In addition to those mentioned, classification of video, or shots within video, presents further challenges because of the variations and quality of images present in most videos. In most video sequences, only part of the scene is visible in most frames. As used herein, "scene" refers to the setting or content of the image or video desirous of classification (i.e. the context or environment of a video shot) (e.g. desert, mountainous, sky, ocean, etc.). In many videos, wide-angle shots are interspersed with close-up shots. During the close-up shots, the camera is typically focused on the subject of interest, often resulting in a blurred background, thus confusing any part of the scene type that is visible. Most videos also include shots in which either the camera or objects within the scene are moving, again causing blurring of the images within the shot.

Additionally, scene content in videos often varies immensely in appearance, resulting in difficulty in identification of such content. For example, images of buildings vary in size, color, shape, materials from which they are made, etc.; trees change appearance depending on the season (i.e. leaves change color in the fall, branches become bare during the winter, etc.); snow may be present in any type of outdoor scene; etc. In addition, the subject of a video shot may be filmed from different angles within the shot, causing the subject to appear differently across frames in the shot. Thus, because video often represents wide varieties of content and subjects, even within a particular content type, identification of that content is exceedingly difficult.

Further, use of raw or basic features, which are sufficient for some conventional image classification systems, are insufficient for a video classification system because videos typically include a multiplicity of image types. For example, the color distribution may be the same for a beach shot with white sand as for a snow-covered prairie, or an ocean shot compared to a sky shot, etc. Additionally, the mere detection or identification of a color or type of material in a scene does not necessarily enable classification of the scene. For example, a snow-tipped mountain covered with forest has a similar distribution of materials and colors as a close-up view of evergreen trees emerging from a snow-blanketed base. Accordingly, the use of strong features, as well as the spatial arrangement of materials identified by those features, is helpful in labeling the wide variety of images in video to enable accurate classification of shots within video.

One system that attempts to overcome the previously-described hurdles in order to classify videos is the "Vicar" system, described in M. Israel et al., Automating the Construction of Scene Classifiers for Content-Based Video Retrieval, MDM/KDD'04 (2004). The Vicar system selects one or more representative or "key" frames from a video, and divides each of the key frames into a grid. Each grid cell is further divided into rectangular "patches," and each patch is classified into a general category (e.g. sky, grass, tree, sand, building, etc.) using color and texture features and a k-Nearest Neighbor classifier. The frequency of occurrence of each category in each grid cell is computed and used to classify the overall image. This system infers that if a representative frame or frames comprise a certain type of image, then the entire shot or video likely corresponds to the same type, and is thus labeled accordingly.

The Vicar system, however, has many drawbacks that produce inconsistent results. For example, selection of key frames is a relatively arbitrary process, and an easily-classifiable frame (i.e. clear, non-occluded, etc.) is not necessarily representative of the scene type(s) associated with a shot or video from which the frame was selected. Further, the key frames are partitioned based on a predetermined grid, such that resulting grid cells may (and often do) contain more than one category, thus leading to confusion of scene types. Also, the color and texture features used in the system are relatively weak features, which are inadequate for classifying many categories of images. Additionally, the inference that a key frame or frames adequately and accurately represents an entire sequence of frames does not take into account variations in shots, especially for long or extended shots in videos.

Video classification has many practical uses. For example, accurate and efficient classification of video, or shots within video, enables content-based video indexing and retrieval. Such indexing and retrieval is useful for cataloguing and searching large databases of videos and video clips for use in promotional advertisements, movie and television trailers, newscasts, etc. Additionally, by classifying videos and thus narrowing the scope of videos that contain certain subject matter, processing times and accuracy of other, related image or video analysis algorithms is improved. Further, identification and classification of disparate shots within a video enables shot boundary detection and indexing associated with the video.

For these and many other reasons, there is a continuing need for a system or method that accurately and efficiently classifies shots in video based on a plurality of images or frames associated with the shot. There is a further need for a system that is able to classify shots as belonging to multiple classes of scene types, and identify particular timecodes within the video shot at which scene classes vary.

BRIEF SUMMARY OF THE DISCLOSURE

Briefly described, and according to one embodiment, the present disclosure is directed to a system for classifying videos based on video content, comprising a processor, one or more software modules including one or more classifiers, and a computer program product. The computer program product includes a computer-readable medium that is usable by the processor, the medium having stored thereon a sequence of instructions associated with the one or more software modules that when executed by the processor causes the execution of the steps of receiving a video file, the video file including a plurality of frames; extracting a subset of frames from the video file; if one or more frames in the extracted subset of frames comprises a dark frame, discarding the one or more dark frames from the subset; and determining whether each frame in the extracted subset includes content associated with a general content category. The processor causes further execution of the steps of, for each frame in the extracted subset that includes content associated with the general content category, generating a scene classification score vector for the frame via one or more scene classifiers, the scene classification score vector including one or more scene classification scores associated with one or more predefined scene categories within the general content category; determining a representative scene classification score vector for the video file based on the generated scene classification score vectors for each extracted frame in the subset that includes content associated with the general content category; and associating the video file with the one or more predefined scene categories based on the representative scene classification score vector.

According to one aspect of the present system, the one or more software modules are selected from the group comprising: an intensity classification module, an indoor/outdoor classification module, an outdoor classification module, a segmentation module, a material arrangement module, and a video file classification module.

According to another aspect, the step of generating the scene classification score vector for each frame in the extracted subset of frames that includes content associated with the general content category further comprises the steps of dividing the frame into one or more segments based on image content in each segment; generating a material classification score vector for each segment, each material classification score vector including one or more material values associated with one or more predefined material content types, wherein each material value represents a probability that the respective segment includes that type of material content; assigning the material classification score vector for each segment to each respective pixel in the segment; generating a material arrangement vector for the frame based on the material classification score vectors assigned to each pixel;

and classifying the material arrangement vector via the one or more scene classifiers to generate the scene classification score vector for the frame.

According to a further aspect, the adjacent segments are combined based on similar content properties of the segments. In one aspect, the one or more predefined material content types are selected from the group comprising: building, grass, person, road/sidewalk, rock, sand/gravel/soil, sky/clouds, snow/ice, trees/plants, vehicle, water, and miscellaneous. According to another aspect, the material arrangement vector represents the spatial arrangement of material content in the frame.

According to an additional aspect, a dark frame comprises a frame shot in low or no light. According to another aspect, the processor causes execution of the further step of determining whether any of the frames in the extracted subset of frames comprises a dark frame. In one aspect, the step of determining whether any of the frames in the extracted subset of frames comprises a dark frame further comprises the steps of, for each frame, dividing the frame into a plurality of grid cells; calculating an intensity value for each pixel in each cell; calculating an average intensity value across all pixels in each cell; concatenating the average intensity values for each cell in the frame to form an intensity feature vector for the frame; and classifying the intensity feature vector via an intensity classifier to determine if the frame comprises a dark frame.

According to yet another aspect, the step of determining whether each frame in the extracted subset includes content associated with the general content category further comprises the steps of extracting a plurality of features from each frame; generating a feature vector for each frame, wherein each feature vector includes the extracted features for the respective frame; and classifying the feature vector for each frame via a general category classifier to determine whether each frame includes content associated with the general content category.

According to still another aspect, the general content category comprises outdoor content. In one aspect, the one or more predefined scene categories are selected from the group comprising: coast/beach, desert, forest, grassland, highway, indoor, lake/river, mountainous, open water, outdoor, sky, snow, and urban.

According to a further aspect, each of the one or more scene classification scores represents the probability that a frame includes content associated with each of the respective predefined scene categories. In one aspect, each of the one or more scene classification scores comprises a value greater than or equal to zero and less than or equal to one.

According to an additional aspect, the representative scene classification score vector comprises a statistical property of the generated scene classification score vectors. In one aspect, the statistical property is selected from the group comprising: average, median, maximum, and minimum.

According to a yet further aspect, the step of associating the video file with the one or more scene categories further comprises the steps of identifying representative scene classification scores in the representative scene classification score vector that exceed a predetermined threshold value; and, for each representative scene classification score that exceeds the threshold value, associating the video file with the one or more predefined scene categories associated with the classification scores that exceeded the threshold value.

According to one aspect, the video file comprises a shot of video.

According to a still another aspect, the processor causes further execution of the step of generating a report including the one or more predefined scene categories associated with the video file.

According to an additional aspect, the one or more scene categories associated with the video file are used for indexing and retrieval of the video file.

According to another embodiment, the present disclosure is directed to a method for classifying videos based on video content, comprising the steps of receiving a video file, the video file including a plurality of frames; extracting a subset of frames from the video file; if one or more frames in the extracted subset of frames comprises a dark frame, discarding the one or more dark frames from the subset; and determining whether each frame in the extracted subset includes content associated with a general content category. The method further comprises the steps of, for each frame in the extracted subset that includes content associated with the general content category, generating a scene classification score vector for the frame via one or more scene classifiers, the scene classification score vector including one or more scene classification scores associated with one or more predefined scene categories within the general content category; determining a representative scene classification score vector for the video file based on the generated scene classification score vectors for each extracted frame in the subset that includes content associated with the general content category; and labeling the video file according to the one or more predefined scene categories based on the representative scene classification score vector.

According to one aspect of the present method, the step of generating the scene classification score vector for each frame in the extracted subset of frames that includes content associated with the general content category further comprises the steps of dividing the frame into one or more segments based on image content in each segment; generating a material classification score vector for each segment, each material classification score vector including one or more material values associated with one or more predefined material content types, wherein each material value represents a probability that the respective segment includes that type of material content; assigning the material classification score vector for each segment to each respective pixel in the segment; generating a material arrangement vector for the frame based on the material classification score vectors assigned to each pixel; and classifying the material arrangement vector via the one or more scene classifiers to generate the scene classification score vector for the frame.

According to a further aspect, the adjacent segments are combined based on similar content properties of the segments. In one aspect, the one or more predefined material content types are selected from the group comprising: building, grass, person, road/sidewalk, rock, sand/gravel/soil, sky/clouds, snow/ice, trees/plants, vehicle, water, and miscellaneous. According to another aspect, the material arrangement vector represents the spatial arrangement of material content in the frame.

According to an additional aspect, a dark frame comprises a frame shot in low or no light. According to another aspect, the method comprises the further step of determining whether any of the frames in the extracted subset of frames comprises a dark frame. In one aspect, the step of determining whether any of the frames in the extracted subset of frames comprises a dark frame further comprises the steps of, for each frame, dividing the frame into a plurality of grid cells; calculating an intensity value for each pixel in each cell; calculating an average intensity value across all pixels in each cell; concatenating the average intensity values for each cell in the frame to form an intensity feature vector for the frame; and classifying the intensity feature vector via an intensity classifier to determine if the frame comprises a dark frame.

According to yet another aspect, the step of determining whether each frame in the extracted subset includes content associated with the general content category further comprises the steps of extracting a plurality of features from each frame; generating a feature vector for each frame, wherein each feature vector includes the extracted features for the respective frame; and classifying the feature vector for each frame via a general category classifier to determine whether each frame includes content associated with the general content category.

According to still another aspect, the general content category comprises outdoor content. In one aspect, the one or more predefined scene categories are selected from the group comprising: coast/beach, desert, forest, grassland, highway, indoor, lake/river, mountainous, open water, outdoor, sky, snow, and urban.

According to a further aspect, each of the one or more scene classification scores represents the probability that a frame includes content associated with each of the respective predefined scene categories. In one aspect, each of the one or more scene classification scores comprises a value greater than or equal to zero and less than or equal to one.

According to an additional aspect, the representative scene classification score vector comprises a statistical property of the generated scene classification score vectors. In one aspect, the statistical property is selected from the group comprising: average, median, maximum, and minimum.

According to a yet further aspect, the step of labeling the video file further comprises the steps of identifying representative scene classification scores in the representative scene classification score vector that exceed a predetermined threshold value; and, for each representative scene classification score that exceeds the threshold value, associating the video file with the one or more predefined scene categories associated with the classification scores that exceeded the threshold value.

According to one aspect, the video file comprises a shot of video.

According to still another aspect, the method further comprises the step of generating a report based on the labeled video file.

According to an additional aspect, the labeled one or more scene categories are used for indexing and retrieval of the video file.

According to a further embodiment, the present disclosure is directed to a method for classifying videos based on video content, comprising the steps of receiving a video file, the video file including a plurality of frames, wherein each frame includes a plurality of pixels; and extracting a set of frames from the video file. The method further comprises the steps of, for each frame in the extracted set of frames, determining whether the frame comprises a poor classification frame; if one or more frames in the extracted set of frames comprises a poor classification frame, removing the one or more poor classification frames from the set; dividing each frame in the set of frames into one or more segments, wherein each segment includes relatively uniform image content; and extracting image features from each segment to form a feature vector associated with each segment. The method comprises the additional steps of generating a material classification score vector for each segment via one or more material classifiers based on the feature vector associated with each segment, wherein each material classification score vector includes one or more material classification scores associated with one or more predefined material content categories; and assigning each material classification score vector associated with its respective segment to each pixel in each respective segment for each respective frame in the set of frames.

According to one aspect, the method further comprises the step of storing the material classification score vectors assigned to each pixel in a database for subsequent use in video file classification.

According to another aspect, the method further comprises the step of combining adjacent segments based on similar image content features extracted from the segments.

According to an additional aspect, poor classification frames are determined via one or more classifiers. In one aspect, a poor classification frame comprises a frame associated with at least one of the following frame types: a frame shot in low light, a frame shot at night, a blurry frame, and an undetermined frame.

According to a further aspect, image features comprise one or more features selected from the group comprising: color features, edge features, line features, texture features, and shape features. In one aspect, image features comprise data associated with image content.

According to yet another aspect, the one or more material classifiers are hierarchically related.

According to still another aspect, the one or more predefined material content categories are selected from the group comprising: building, grass, person, road/sidewalk, rock, sand/gravel/soil, sky/clouds, snow/ice, trees/plants, vehicle, water, and miscellaneous.

According to an additional aspect, each of the one or more material classification scores represents the probability that a frame includes content associated with each of the respective predefined material content categories.

According to one aspect, the video file comprises a shot of video.

According to an additional embodiment, the present disclosure is directed to a method for classifying a video file according to one or more scene classes, the video file including a plurality of frames, wherein each frame includes a plurality of pixels, and wherein each pixel is associated with a vector of material classification scores describing the material content in its respective frame. The method comprises the steps of: (a) dividing each frame into a plurality of grid cells; (b) for each frame, retrieving the vector of material classification scores for each pixel in each cell; (c) for each grid cell, averaging the material classification scores across each pixel in the cell to form a material occurrence vector for the cell; (d) concatenating the material occurrence vectors for the plurality of grid cells in each frame to generate a material arrangement vector for each frame; (e) generating a scene classification score associated with each of the one or more scene classes for each frame in the video file via one or more scene classifiers based on the material arrangement vectors generated for each frame; (f) generating a representative scene classification score for the video file for each of the one or more scene classes based on the scene classification scores generated for each frame; and (g) if one or more of the representative scene classification scores is above a predetermined threshold value, labeling the video file according to the respective scene classes associated with the one or more scene classification scores that are above the predetermined threshold value.

According to one aspect, the method further comprises the step of repeating steps (a)-(e) one or more times using varying numbers of grid cells. In one aspect, the one or more scene classifiers comprise a spatial pyramid of classifiers, and wherein varying weights are associated with the scene classification scores.

According to another aspect, the material content is selected from the group comprising: building, grass, person, road/sidewalk, rock, sand/gravel/soil, sky/clouds, snow/ice, trees/plants, vehicle, water, and miscellaneous.

According to a further aspect, the material occurrence vector represents the proportion of each type of material content included in the cell. In one aspect, the material occurrence vectors are concatenated in an ordered manner.

According to an additional aspect, each of the material classification scores represents the probability that a frame includes content associated with each of the respective types of material content. In one aspect, each of the one or more scene classification scores represents the probability that a frame includes content associated with each of the respective one or more scene classes.

According to yet another aspect, the material arrangement vector generated for each frame represents the spatial arrangement of material content in the frame.

According to still another aspect, the one or more scene classes are selected from the group comprising: coast/beach, desert, forest, grassland, highway, indoor, lake/river, mountainous, open water, outdoor, sky, snow, and urban.

According to another aspect, the representative scene classification score for each of the one or more scene classes comprises a statistical property of the generated scene classification scores. In one aspect, the statistical property is selected from the group comprising: average, median, maximum, and minimum.

According to a yet further aspect, the video file comprises a shot of video.

According to an additional aspect, the method further comprises the step of generating a report based on the labeled video file.

According to one aspect, the labeled one or more scene classes are used for indexing and retrieval of the video file.

According to still another embodiment, the present disclosure is directed to a method for labeling videos based on video content, comprising the steps of receiving a video file, wherein the video file includes a plurality of frames; extracting a set of frames from the plurality of frames in the video file; for each frame in the extracted set of frames, calculating a probability that the frame includes content associated with a predefined scene category; determining a representative probability for the set of frames based on the calculated probabilities for each frame; and if the representative probability exceeds a predetermined threshold, associating the scene category with the video file.

According to one aspect of the present method, the representative probability comprises a statistical property of the calculated probabilities for each frame. In one aspect, the statistical property is selected from the group comprising: average, median, maximum, and minimum.

According to another aspect, the method further comprises the step of indexing the video file according to the associated scene category for search and retrieval purposes.

According to an additional aspect, the scene category is selected from the list comprising: coast/beach, desert, forest, grassland, highway, indoor, lake/river, mountainous, open water, outdoor, sky, snow, and urban.

According to a further aspect, the calculated probability for each frame is calculated via a classifier.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF PREFERRED EMBODIMENTS

Figure 1:
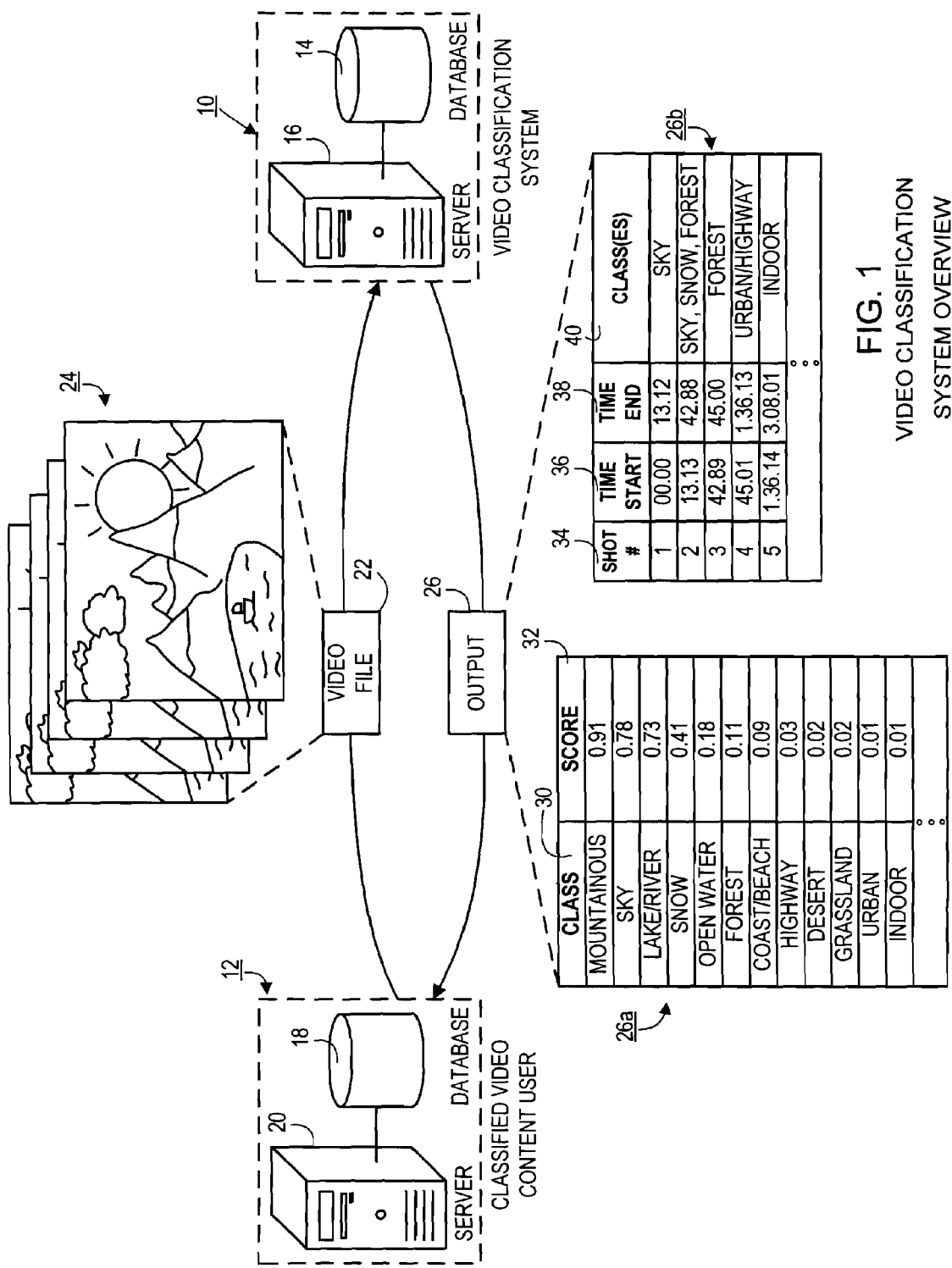
FIG. 1 illustrates a video classification system according to an embodiment of the present system.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Overview

Aspects of the present disclosure generally relate to systems and methods for semantically classifying shots of video based on video content. Generally, embodiments of the present system analyze video files and associate predefined textual descriptors to the video files. The textual descriptors relate to predefined scene classes or categories describing content in the files, such as mountain, coast, indoor, urban, forest, and the like. Typically, a video file comprises a shot of video (as defined previously), or a sequence of frames from a video, or an entire video itself. Once classified, the video file may be used for a variety of purposes, including content-based indexing and retrieval, shot boundary detection and identification, and other similar purposes.

Referring now to FIG. 1, an embodiment of the video classification system 10 is shown. The system 10 is shown in an exemplary environment in which the system interacts with a classified video content user 12. The classified video content user 12 is an entity that has a use for classified video content, such as a movie or television production studio, an advertising agency, and Internet web service content provider, or other similar entity. As will be understood and appreciated by one of ordinary skill in the art, and as shown in FIG. 1, embodiments of the video classification system 10 comprise computer systems including databases 14 and other storage apparatuses, servers 16, and other components (not specifically shown), such as processors, terminals and displays, computer-readable media, algorithms, modules, and other computer-related components. The computer systems are especially configured and adapted to perform the functions and processes of the present system as described herein (i.e. they are particular machines). Further, any results or outputs 26 relating to classification of video files may be stored in a database 16, 18, output as an electronic or printed report, displayed on a computer terminal, or otherwise delivered to a system operator or user for analysis, review, and/or further processing.

As shown in the embodiment of FIG. 1, the classified video content user 12 transmits a video file 22 to the video classification system 10 for analysis and classification. Typically, the video file includes a plurality of frames 24 comprising a plurality of images that together make up the video file. As will be understood, the video file 22, resulting output 26, and any other data or files are transmitted between the classified video content user 12 and the video classification system 10 via a service oriented architecture (SOA), or some other similar file transfer protocol. As shown, the exemplary video file includes, at least in part, images corresponding to a mountain landscape scene. This exemplary mountain landscape scene is referenced here and in other parts of this disclosure for illustrative purposes only, and is in no way intended to limit the scope of the present system.

Upon receipt of a video file 22, the classification system 10 processes the file (as described in detail below) to identify and classify the file or shots within the file according to zero or more predefined scene categories. In some circumstances, based on the nature of the content of the video file, no predefined scene category applies to the video. In other circumstances, multiple classes apply to the given video file. Examples of scene categories include coast/beach, desert, forest, grassland, highway, indoor, lake/river, mountainous, open water, outdoor, sky, snow, urban, and other similar categories as will occur to one of ordinary skill in the art. As will be appreciated, however, embodiments of the present system are not limited to the specific scene categories mentioned, and other categories are possible according to various embodiments and aspects of the present system.

Once processed, the video classification system 10 generates an output 26 corresponding to the particular video file 22. Representative outputs 26a, 26b are presented for exemplary purposes. Output 26a comprises a data table listing the resulting classification score for each scene category for a given video shot. As shown, the table 26a includes two data categories or fields: scene class 30 and classification score 32. As will be understood, however, the data categories or files are not limited to the fields shown, and other embodiments include additional fields as will occur to one of ordinary skill in the art. As will also be understood, although a representative listing of scene classes is shown, actual data tables constructed in accordance with embodiments of the present system may include other scene classes not specifically mentioned herein.

According to one embodiment of output 26a, the classification score 32 is a value between 0 and 1 indicating the probability that a particular shot includes content associated with a predefined scene class 30. As will be understood, the classification score is represented in a variety of ways according to various embodiments, such as a percentage, a ratio (as compared to the other scene categories), and other similar ways. As shown, exemplary table 26a indicates a hypothetical set of classification scores for the mountain shot associated with video file 22 and shown in frames 24. The classification scores indicate a high probability that the scene includes content associated with (and therefore classified by) mountains (i.e. "mountainous"), "sky," and a "lake/river" (shown by classification scores 0.91, 0.78, and 0.73, respectively). These scores are as expected, considering the exemplary images 24 include mountains, sky, and a lake. Scene category "snow" received a significant score as well (i.e. 0.41), indicating that the shot contains some portion of this type of content.

Once the classification scores are calculated, a threshold value is applied to the scores to identify the scene classes that likely apply to the given shot. For example, a system operator may define a threshold value of 0.4, and thus any scene category receiving a classification score above the threshold is associated with the shot. Thus, if 0.4 were used as a threshold, then the shot would be associated with categories "mountainous," "sky," "lake/river," and "snow." If a higher threshold were used, say 0.7, then the shot would be classified as "mountainous," "sky," and "lake/river". A higher threshold might be used, for example, if a system operator desires to label shots only according to content that is prominent in the shots. According to one embodiment, the threshold is varied on a per-class basis. As will be appreciated, the threshold can be varied at a system operator's discretion to produce more accurate or focused results, include more or fewer classes per shot, etc.

As shown in FIG. 1, output 26b comprises a data table indicating the identified class(es) for each shot of video contained in the video file (assuming the video file includes more than one shot), as well as the identified start and end timecodes for each shot. As shown, the table 26b includes four data categories or fields: shot number 34, start timecode 36, end timecode 38, and scene class(es) 40. As will be understood, however, the data categories or files are not limited to the fields shown, and other embodiments include additional fields as will occur to one of ordinary skill in the art.

According to various embodiments, table 26b is used as a subsequent output in conjunction with table 26a after the values in 26a have been thresholded for many shots. Or, output 26b comprises an output associated with a shot boundary detection embodiment, in which a video file 22 comprises many undetected shots, and these shots are identified by the video classification system 10 based on variations in scene classes. As shown in table 26b, for example, the system 10 classified the frames associated with hypothetical shot 1 as including "sky" content until 13.12 seconds into the video. At the 13.13 second mark, the classification system 10 identified and classified the shot frames as pertaining to "sky," "snow," and "forest." Thus, the system determined that, based on the change in scene classes, a shot boundary had occurred (again, based on some predefined classification score threshold value). As will be understood and appreciated, the exemplary outputs 26a, 26b are presented for illustrative purposes only, and other outputs are possible according to various embodiments of the present system.

As shown in FIG. 1, once a video file has been classified by the video classification system 10 and a corresponding output 26 or outputs have been generated, the classification results are transmitted to the classified video content user 12 for further use. For example, one application of embodiments of the present system is video indexing and retrieval. In order to accomplish such indexing and retrieval, in one embodiment, shots and/or videos that have been classified and labeled according to predefined scene classes are associated with corresponding metadata identifiers linked to identified scene classes. These metadata identifiers are generally stored in index files (e.g. in database 18) and are configured to be searched in order to locate and retrieve videos or shots of videos with the associated classified content. Accordingly, vast amounts of video files 22 (i.e. videos, shots within videos, and sequences of video frames) may be indexed and searched according to content in the video files based on the semantic classes linked to the metadata identifiers.

Although the classified video content user 12 is illustrated in the embodiment of FIG. 1 as an entity separate and distinct from the video classification system 10, embodiments of the present invention are not limited to operation with third party entities 12. For example, according to one embodiment, video files 22 and outputs 26 are stored within the video classification system database 14, and no interaction with outside entities is required. Thus, in one embodiment, system functions and processes described herein are carried out entirely within video classification system 10.

For purposes of example throughout this document, exemplary categories of scene classes and material classes are given, such as indoor, outdoor, urban, mountainous, highway, vehicle, forest, etc. Additionally, the exemplary embodiment described herein is primarily couched in terms of a classification system that identifies specific categories of "outdoor" scenes. It should be understood, however, that the present systems and methods are in no way limited to outdoor scenes, and the present systems and methods may be applied to indoor scenes or other types of scenes based on variations in training data, image features, etc. Accordingly, outdoor video classification systems are often described herein for illustrative purposes only, but are in no way intended to limit the scope of the present systems.

Figure 2:
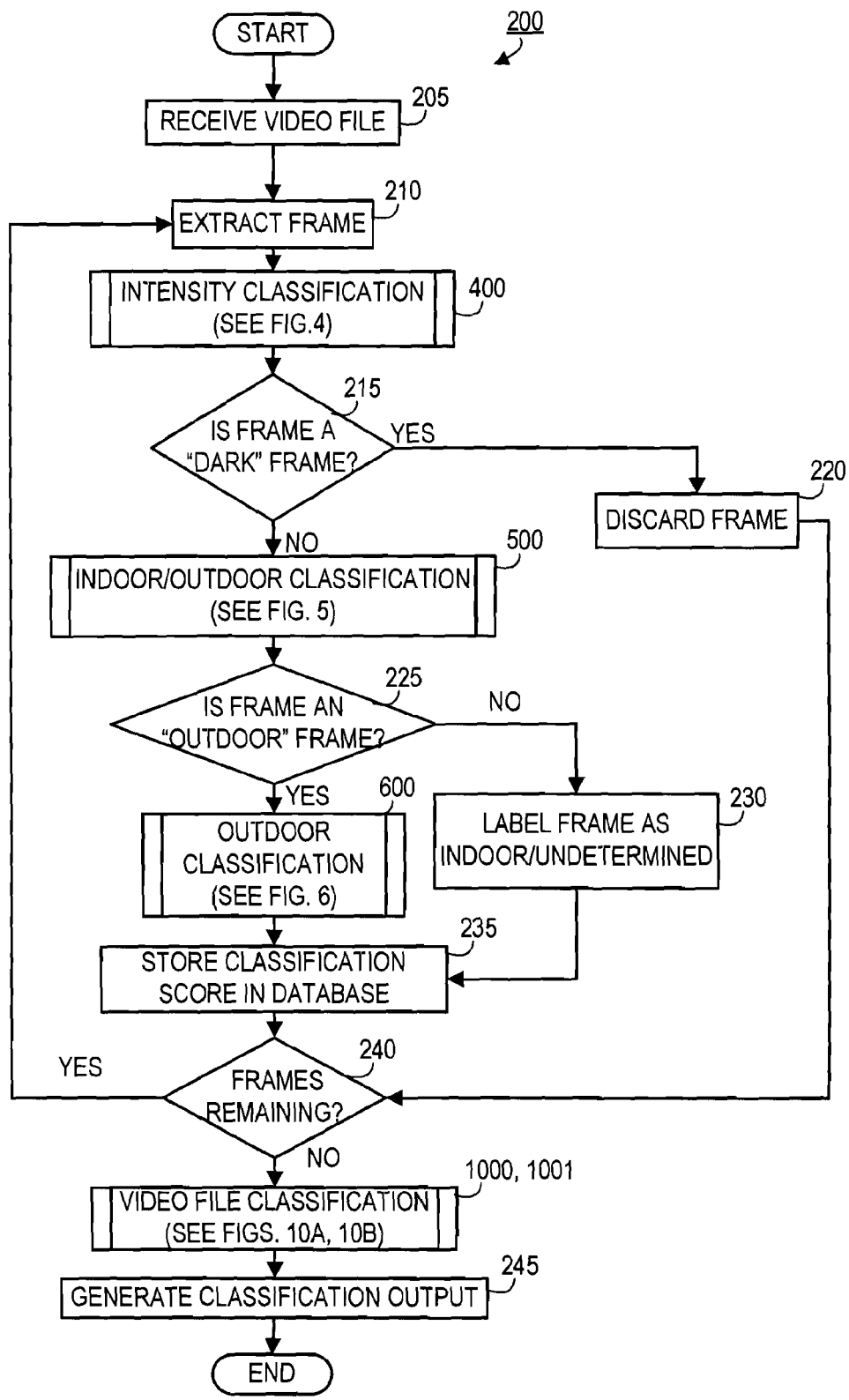
FIG. 2 is a flowchart illustrating the overall functions and processes performed, from a high-level perspective, by one embodiment of the present video classification system.

FIG. 2 is a flowchart illustrating the overall functions and processes 200 performed, from a high-level perspective, by one embodiment of the present video classification system 10. The overall process 200 is described initially in a broad sense in conjunction with FIG. 2, and the details and specific aspects of each component of the system are described in greater detail below. Starting at step 205, the system 10 receives a video file 22 to be processed. As described previously, the video file comprises either an entire video, or one or more video shots, or merely a sequence of frames/images. If only a single shot is received, then the system classifies the shot as described below. In one embodiment, a plurality of shots are received (or a file corresponding to an entire video), as well as a list of shot boundaries identifying the beginning and ending timecodes for the shots, and each individual shot is classified. According to one embodiment, the shot boundaries in the list are identified via the algorithm described in Z. Rasheed and M. Shah, *Scene Detection in Hollywood Movies and TV Shows, IEEE Conference on Computer Vision and Pattern Recognition*, vol. 2, pp. 11-343-8 (2003), which is incorporated by reference herein as if set forth herein in its entirety. As will be appreciated, however, shot boundaries are identified via other similar mechanisms in other embodiments. In still a further embodiment, an entire video or sequence of frames is received with no shot boundaries, and the present system 10 identifies shot boundaries based on scene classes changes across the video or frame sequence (described in greater detail below).

Regardless of the type of video file received, the system 10 extracts an initial frame from the video file for processing (step 210). Embodiments of the present system analyze and classify single frames, and then combine the results for each analyzed frame to produce an overall classification or classifications for the shot (described below). Preferably, to reduce overall processing time and increase efficiency, the system only extracts and analyzes a subset of frames in the video, such as one frame from the video file for every ⅓ second of recorded time. Typically, videos are recorded at a rate of 24 frames/second (or, 8 frames per ⅓ second). Thus, a preferred embodiment only analyzes 1 out of 8 frames in a recorded video file. For most applications, a sampling rate of one frame for every ⅓ second of recording time produces satisfactory results, and significantly reduces overall computation time. As will be understood by one of ordinary skill in the art, however, other sampling rates are possible. In fact, each frame in a video file 22 may be analyzed if so desired by a system operator.

After a frame has been extracted, the frame is analyzed by an intensity classification process 400 to determine if the frame is a good candidate for overall classification. "Dark" frames (i.e. those shot in poor lighting or at night, etc.) are difficult to classify, and thus tend to produce inconsistent results. Accordingly, if the intensity classification process 400 determines that a frame is too dark for processing (step 215), then the frame is discarded (i.e. not analyzed further) (step 220), and a new frame is selected for processing. If, however, the frame is not a dark frame, then the frame is passed through the indoor/outdoor classification process 500 to determine whether the frame includes content associated with an indoor scene or outdoor scene. If the frame is not an outdoor frame (as determined by the indoor/outdoor classification process), then the frame is labeled (i.e. classified) as indoor or undetermined, assigned a classification score of "0" for all outdoor categories or scene classes (discussed below), and stored in a database 14 (steps 225, 230, 235).

Figure 3:
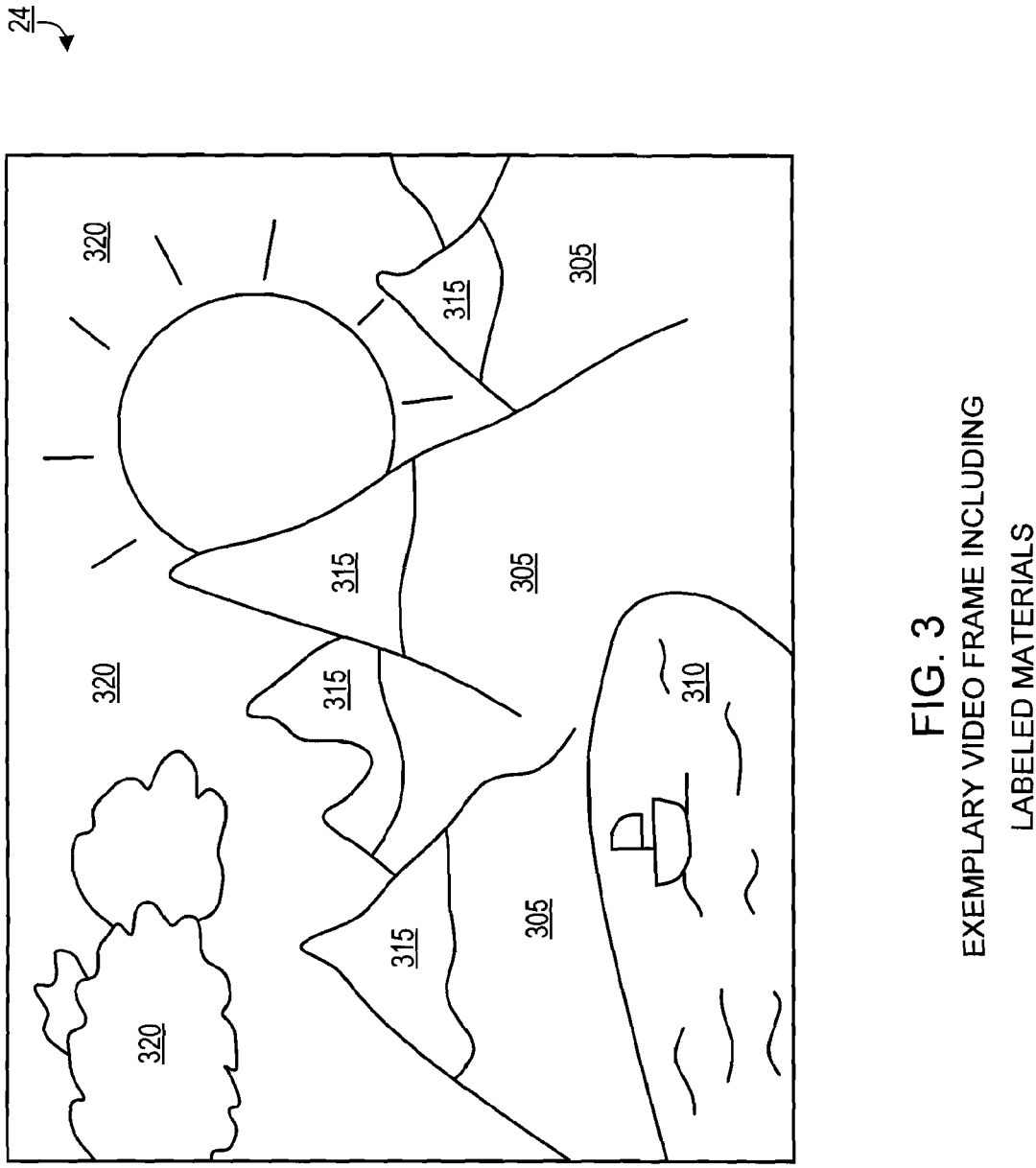
FIG. 3 illustrates an exemplary frame extracted from a video file showing a mountain scene.

If, however, the frame is in fact an outdoor frame, then the frame is analyzed by the outdoor classification process 600 to determine which category or categories of material classes apply to the frame. As used herein, "material" refers to the type or category of content shown in a frame (e.g. sand, grass, rock, building, vehicle, etc.). For example, FIG. 3 illustrates an exemplary frame 24 extracted from a video file 22 showing a mountain scene. As shown, the frame includes a variety of materials, such as rock 305, water 310, snow/ice 315, sky/clouds 320, etc. The identified material classes (i.e. classification scores), and their spatial arrangement within the frame, are used by subsequent processes to classify the entire frame, and eventually the entire shot (described below). Once the material class(es) for the outdoor frame are identified (as determined by the outdoor classification process), then the resulting classification scores are stored in a database 14 (step 235 in FIG. 2) for further processing.

Still referring to FIG. 2, at step 240, the system 10 determines whether any frames are remaining in the video file. If any frames are remaining, then the system extracts the next frame (typically, according to a predefined sampling rate, discussed above), and repeats the steps of overall process 200 for the next frame. As will be understood, process 200 operates on a looping basis until all selected frames in the video file have been processed. Once all frames have been analyzed, the video file classification process 1000, 1001 analyzes the stored classification scores to classify the video file or shot(s)

within the video file, and generates a classification output 26 (step 245). After a classification output has been generated, the process 200 ends.

Feature Extraction

Within embodiments of the present system, "features" are used to identify content in images/frames, train classifiers to recognize such image content, etc. As will be understood and appreciated by those of ordinary skill in the art, a "feature" refers to an individual, measurable heuristic property of an image used in pattern recognition and classification of the image. Essentially, features are data extracted from an image region and used to characterize its appearance.

Various types of features are used in image classification systems, such as color, texture, etc. Features vary in complexity and accuracy (i.e. strong v. weak), producing varying results. Typically, "weak" features, such as raw pixel values, average RGB values in an image region, edge strength associated with individual pixels, etc., require less computation, but are less accurate as compared to strong features. "Strong" features, such as texture, shape, etc., are typically more descriptive and better characterize the appearance of an image (i.e. are more accurate), but usually require more computation and are more difficult to develop. Preferably, embodiments of the present system use strong features, but other features are used in various embodiments as will occur to one of ordinary skill in the art. The preferred embodiment of the present system uses strong color, edge, line, texture, and shape features, as described in further detail below.

Color

According to a preferred embodiment, the color features comprise a histogram in CIELAB colorspace. As will be understood, a traditional "Lab" colorspace is a color-opponent space with dimension L for brightness and a and b for the color-opponent dimensions, based on nonlinearly-compressed CIE XYZ color space coordinates. The CIELAB colorspace actually uses the L*, a*, and b* coordinates (as opposed to L, a, and b). Preferably, a three-dimensional (3D) color histogram is formed from the 3-channel color for each pixel in an image using 4 bins for each channel, resulting in a 64-dimensional histogram. As will be understood, while the CIELAB colorspace is preferred, other similar colorspaces are used for color features according to various embodiments of the present system.

Edges

According to one embodiment, the edge features comprise edge strength and edge direction histograms. Preferably, edge strength in each of the x and y directions is computed using the Sobel transform. The computed edge strengths are used to form an edge strength histogram with 8 bins. Additionally, edge direction is computed at each pixel in the image to form a 16-bin histogram of these direction measures.

Lines

According to one embodiment, the line features comprise a line length histogram. Preferably, an edge image is formed using the Sobel transform. Preferably, lines are detected via application of the Hough transform. Generally, the quantity of lines of different lengths is enumerated into a histogram with bins representing line lengths of 1 to 3, 4 to 7, 8 to 15, 16 to 31, 32 to 64, and 64+ pixels.

Texture

According to one embodiment, the texture features comprise a "texton" histogram and statistics of a Gray-level Co-occurrence Matrix (GLCM). Preferably, the Leung-Malik filter bank is used, as described in T. Leung and J. Malik, *Representing and Recognizing the Visual Appearance of Materials Using Three Dimensional Textons*, International Journal of Computer Vision, 43:29-44 (2001), which is incorporated herein by reference as if set forth herein in its entirety, which consists of edge, bar, and spot filters at different sizes and orientations. Generally, each filter is convolved with a given image, producing a response vector for each pixel in the image region. To form a set of textons, these response vectors are clustered with k-means over a set of "training" images to produce clusters, with each cluster center representing a texton, as described in M. Varma and A. Zisserman, *A Statistical Approach to Texture Classification from Single Images*, International Journal of Computer Vision Special Issue on Texture Analysis and Synthesis, 62(1-2):61-81 (2005), which is incorporated herein by reference as if set forth herein in its entirety. As used herein, "training" images, frames, or data are those that are used to train classifiers (i.e. establish patterns and standards in classifiers), such that classifiers are able to subsequently identify and classify like image features (described in greater detail below).

Given a new image (i.e. a non-training image), the response vectors are computed and the Euclidean distance to each texton is computed to find the closest match for each pixel in the image, thus assigning each pixel to a texton. Accordingly, a texton histogram is computed to provide the distribution of textons within a given image region.

In one embodiment of the present system, the statistics of the GLCM are also used as measures of texture. Generally, the GLCM is formed, and the statistics comprising contrast, correlation, energy, entropy, and homogeneity are computed, as described in C. C. Gotlieb and H. E. Kreyszig, *Texture Descriptors Based on Co-Occurrence Matrices*, Computer Vision, Graphics and Image Processing, 51:76-80 (1990); L. Lepisto et al., *Comparison of Some Content-Based Image Retrieval Systems with Rock Texture Images*, In Proceedings of 10th Finnish AI Conference, pp. 156-63 (2002); and M. Pardo et al., *Rock Texture Retrieval Using Gray Level Co-Occurrence Matrix*, In 5th Nordic Signal Processing Symposium (2002), all of which are incorporated herein by reference as if set forth herein in their entirety.

Shape

According to one embodiment, the shape features comprise circularity, convexity, polygon, and angularity features that characterize the boundary of an image region. Generally, circularity is defined as the ratio of the area of a given image region to the area of a circle having the same perimeter, as represented by the following ratio:

$$\frac{4\Pi \cdot area}{perimeter^2}$$

and as described in V. Mikli et al., *Characterization of Powder Particle Morphology*, In Proceedings of Estonian Academy of Sciences, Engineering, vol. 7, pp. 22-34 (2001), which is incorporated herein by reference as if set forth herein in its entirety. Convexity is generally computed using the convex hull of an image region, as defined by the ratios:

$$\frac{perimeter_{convexhull}}{perimeter_{region}}, \text{ and}$$

$$\frac{area_{region}}{area_{convexhull}}$$

and as described in M. Peura and J. Iivarinen, *Efficiency of Simple Shape Descriptors*, In Proceedings of the Third International Workshop on Visual Form, pp. 443-51 (1997), which is incorporated herein by reference as if set forth herein in its entirety. Typically, the boundary of an image region is fit to a polygon (i.e. a polygon is determined that best approximates the boundary of the image region to a specified approximation accuracy), and the mean, standard deviation, and maximum edge length of the polygon comprise another set of shape features. Generally, angularity is computed as the standard deviation of the curvature at each boundary point, as described in J. Fox et al., *Onboard Autonomous Rock Shape Analysis for Mars Rovers, In IEEE Aerospace Conference Proceedings* (2002), which is incorporated herein by reference as if set forth in its entirety.

Given a region in a frame or image, either to be used as training data (described below) or desirous of classification, the results for each of the features (i.e. color, edges, lines, texture, shape, etc.) are concatenated together to form a feature vector representation of the image region. As used herein, a "feature vector" describes an N-dimensional vector of numerical features that represent the content shown in an image or region of an image. As will be understood and appreciated by one of ordinary skill in the art, creation and use of feature vectors facilitates processing, analysis, and classification of images.

According to one embodiment, before the features are calculated on an image, the image is blurred with a Gaussian kernel of, preferably, size 5×5 to reduce pixel noise within the image. As will be appreciated, while a size of 5×5 is preferred, other embodiments of the present system use other sizes as will occur to one of ordinary skill in the art. Generally, both training images and images desirous of classification are blurred before calculating and forming feature vectors for the image. Additionally, in one embodiment, each feature in the feature vector over a set of training data is normalized to fall between 0 and 1 by computing the maximum and minimum values of each feature and resealing the data. The same resealing is then used on any further computed feature vectors.

Machine Learning Classifiers

As will be described below, several different classifiers are used in association with embodiments of the present system 10. As used herein, a "classifier" refers to an algorithm that, based on a set of human-labeled training data, assigns classification scores to images or regions of images indentifying the probability that a given image contains a particular type of content. Classifiers are trained with sets of feature vectors extracted from training images that have been hand-labeled as including a certain type of content. For example, hypothetical image region 320 shown in FIG. 3 would likely be labeled as "sky/clouds", or something similar. Thus, assuming the frame 24 in FIG. 3 is used as a training image, a feature vector containing features extracted from region 320 would be used as training data to train a classifier to recognize similar content and identify it as "sky/clouds." Once trained, a classifier is able to predict a label or labels for a new feature vector (i.e. a feature vector extracted and formed from an image desirous of classification) in the form of a classification score for each category of content on which the classifier has been trained. According to one embodiment, the resulting classification scores are interpreted as probabilities that a given image includes the corresponding content, and thus the classification scores for each type of content for a given image sum to one. Additionally, in one embodiment, multi-class classifiers are used, in which case the scores also sum to one.

Generally, two main types of known classifiers are preferred according to various embodiments of the present system: Support Vector Machine (SVM) classifiers and Random Forest classifiers. The preferred SVM training library is libSVM, as described in C.-C. Chang and C.-J. Lin, *LIBSVM: A Library for Support Vector Machines*, 2001, available at http://www.csie.ntu.edu.tw/.about.cjlin/libsvm, which is incorporated herein by reference as if set forth herein in its entirety, although other libraries and training data are possible. Generally, the higher the quantity of training data used (i.e. the more training images used), the more accurate the results of a classifier become. Thus, preferably, a large library of training images are used for each classifier discussed herein. For example, the training library used in one test of an embodiment of the present system (described below in the "Experimental Results" section) includes over 10,000 training images. Further, both linear and radial basis function kernels are used in association with various SVM classifiers as identified below. According to one embodiment, Random Forests are used in a similar manner as that described in Shotten (2008) (cited previously), which is incorporated herein by reference as if set forth herein in its entirety. As will be understood, while SVM and Random Forests classifiers are preferred, other types of classifiers are incorporated and used according to various embodiments of the present system.

Generally, the processes and functions described below presuppose that one or more classifiers have been trained for each discrete process, and the processes as described operate on a new image/frame (i.e. an image desirous of classification). Generally, a classifier is trained according to the same procedures and processes as are used to identify and classify new images. Accordingly, unless otherwise indicated, it is assumed that the procedures for training classifiers are similar to procedures used for classification of new images, as described in detail below.

Intensity Classification

As described in reference to FIG. 1, after a frame has been extracted from a video file, it is analyzed via the intensity classification process 400 to determine if it is a "dark" frame. If the content of a given frame is too dark (e.g. the associated shot was filmed at night or with inadequate lighting), then use of the frame for either training or classification purposes should be avoided, as it tends to skew the results. Accordingly, dark frames should be discarded (i.e. ignored) during the overall classification process 200.

Figure 4:
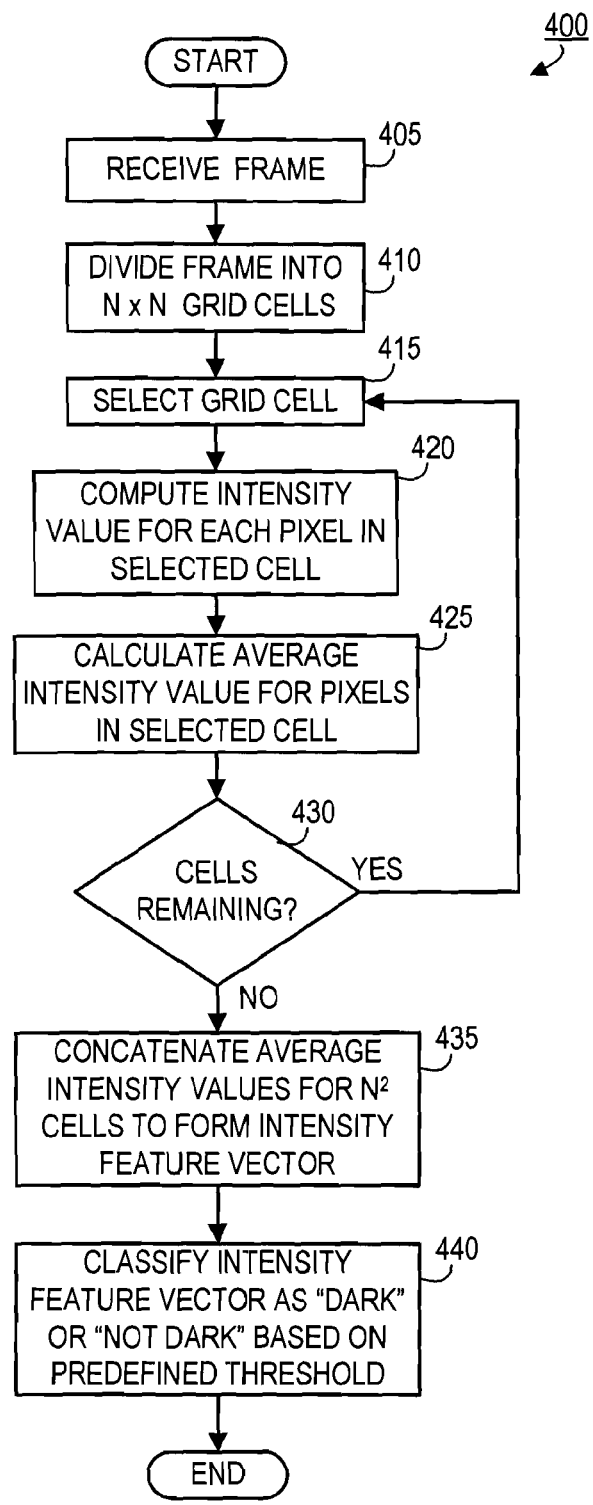
FIG. 4 is a flowchart illustrating one embodiment of the intensity classification process for identifying "dark" frames in a video file.

FIG. 4 is a flowchart illustrating one embodiment of the intensity classification process 400 for identifying "dark" or otherwise poor frames in a video file 22. Starting at step 405, a frame is received for classification. The frame is then divided into N×N grid cells such that classification is achieved for smaller image regions, typically leading to more accurate classification results (step 410). Preferably, each frame is divided into a 4.times.4 grid, but various grid sizes are used according to various embodiments of the present system 10. At steps 415 and 420, a first grid cell of the frame is selected for processing, and the intensity value is computed for each pixel in the selected cell (i.e. an intensity feature set) by converting the image (and cell) from RGB colorspace to greyscale, wherein the greyscale image comprises the intensity image. Typically, the intensity feature set is computed as a linear combination of red, green, and blue values. The intensity values are then averaged across the cell to determine an average intensity value for the selected cell (step 425). At step 430, the system determines whether any cells are remaining in the frame in which the intensity values have not been calculated. If cells are remaining, then the next cell is selected (step 415), and steps 420-430 are repeated for the new cell.

After all cells in the given frame have been processed (i.e. the average intensity value has been calculated for each cell), the average intensity values are concatenated to form an intensity feature vector of $N^2$ values for the frame (step 435).

For example, if the preferred 4.times.4 grid size is used, then the resulting intensity feature vector will include 16 elements/values. Once the intensity feature vector is formed, the vector is classified via an intensity classifier to determine if the corresponding image is "dark" or not (step 440). Generally, a predefined threshold value is selected by a system operator depending on the level of darkness the operator is willing to accept, and the classification score produced during classification (step 440) is compared to the threshold. If the classification score exceeds the threshold, then the frame is deemed a "dark" frame, and is discarded. If the frame is not a dark frame, then the frame is processed further (see FIG. 2).

For purposes of training a classifier used for intensity classification, steps 405-435 are repeated for each training image. Each training image is hand-labeled by a system operator as "dark" or "not dark," and the resulting intensity feature vectors are associated with these labels. The labels and associated feature vectors are used to train a SVM classifier with a linear kernel (typically, a linear kernel is preferable when the classification problem is approximately linearly separable, as is the case here). Thus, given a new image, intensity classification process 400 is able to classify the image accordingly as "dark" or "not dark."

Indoor/Outdoor Classification

Once it has been determined that a given frame is not a dark frame, and is in fact an acceptable frame for classification purposes, the frame is further analyzed via the indoor/outdoor classification process 500 to determine if the frame is an "outdoor" frame, an "indoor" frame, or an "undetermined" frame. According to one embodiment of the present system, shots and/or frames including content of indoor or undetermined scenes are classified as such, but no further analysis or sub-classification is performed on the frames. Thus, if a given frame is classified as an outdoor frame, the frame is further classified (as described below) based on distinct categories of outdoor scenes (i.e. scene classes). As will be understood and appreciated, however, embodiments of the present system are not limited to outdoor scenes, and are capable of identifying and classifying varying types of indoor scenes depending on types of training data and features used. For purposes of illustration, however, an exemplary embodiment for classifying categories of outdoor scenes is described, but is not intended to limit the present system in any way.

Figure 5:
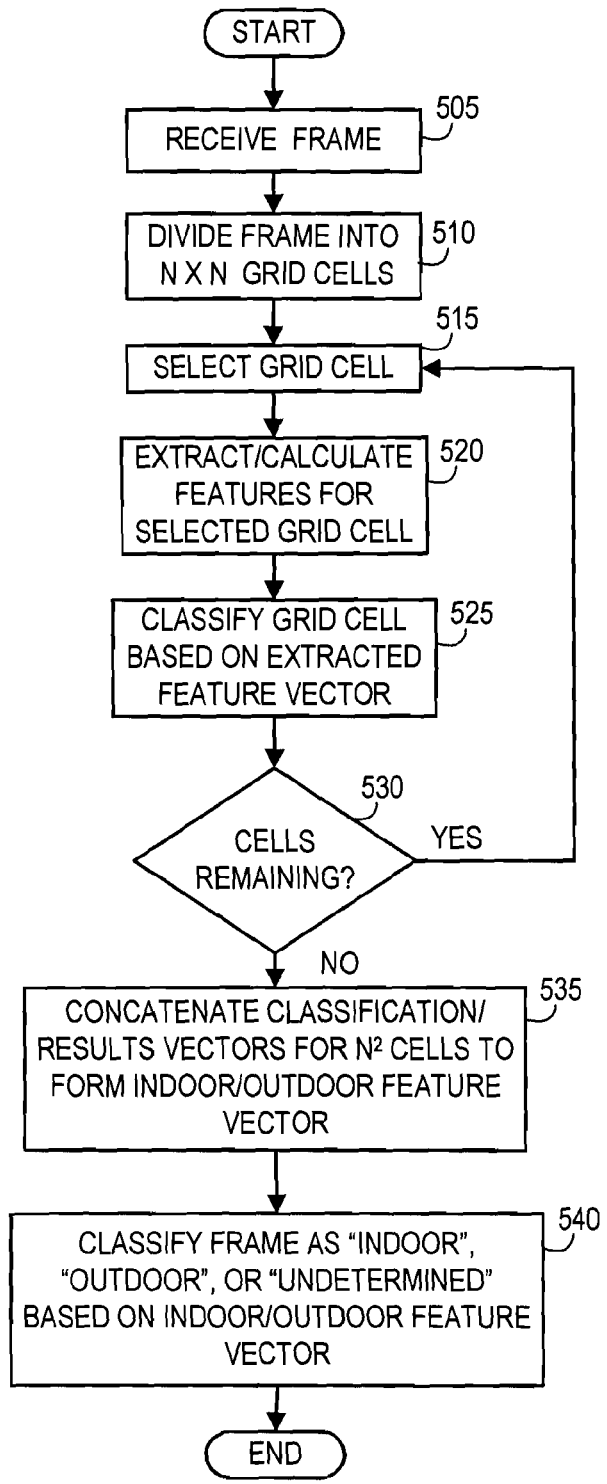
FIG. 5 is a flowchart illustrating an embodiment of the indoor/outdoor classification process for classifying frames in a video file as "indoor," "outdoor," or "undetermined."

FIG. 5 is a flowchart illustrating an embodiment of the indoor/outdoor classification process 500 for classifying frames as "indoor," "outdoor," or "undetermined." As used herein, "indoor" frames are those that include content depicting the inside of buildings or structures (e.g. offices, houses, hospitals, etc.). As used herein, "outdoor" frames are those that include content depicting outdoor scenes (e.g. deserts, mountains, the outside of buildings, roads, etc.). As also used herein, "undetermined" frames are those that include content that does not clearly depict either an indoor or outdoor scene (e.g. close-up views of characters, actors, or objects in which little or no background is visible, blurry frames, etc.).

Starting at step 505, a frame is received for classification. The frame is then divided into N.times.N grid cells such that classification is achieved for smaller image regions, typically leading to more accurate classification results (step 510). Preferably, each frame is divided into a 4.times.4 grid, but various grid sizes are used according to various embodiments of the present system 10. At steps 515 and 520, a first grid cell of the frame is selected for processing, and the color, edge, line, and texture features (described previously) are calculated for the given cell to form a feature vector for the cell. Because each grid cell is a rectangular portion of the frame, the shape features are not calculated (i.e. the rectangular shape is already known). As will be understood, other features in addition to those described are used in various embodiments of the present system as will occur to one of ordinary skill in the art.

At step 525, the feature vector for the selected cell is classified via a classifier to determine the corresponding class for the cell (i.e. indoor, outdoor, or undetermined). For purposes of training this classifier, steps 505-520 are repeated for each cell in each training image. Each cell in each training image is hand-labeled by a system operator as "indoor," "outdoor," or "undetermined," and the resulting feature vectors for each cell are associated with these labels. The labels and associated feature vectors are used to train a SVM classifier with a radial basis function kernel. Typically, a radial basis function kernel is preferable for this classifier because a more complex model generally produces more accurate classification results. The resulting classification vector for the cell generally comprises a 3.times.1-dimensional vector, wherein the 3 values/elements in each vector comprise the classification scores (between 0 and 1) for each of the three possible classes (i.e. indoor, outdoor, or undetermined). At step 530, the system determines whether any unclassified cells are remaining in the frame. If cells are remaining, then the next cell is selected (step 515), and steps 520-530 are repeated for the new cell.

After the classification vectors for all cells in the given frame have been calculated (via step 525), the classification vectors are concatenated to form an indoor/outdoor feature vector for the overall frame that includes the classification scores for each cell (step 535). Once this indoor/outdoor feature vector is formed, the vector is classified via an indoor/outdoor classifier to determine if the corresponding frame is an indoor, outdoor, or undetermined frame (step 540). The classifier used in step 540 is trained based on indoor/outdoor feature vectors associated with training images that are labeled by a system operator as indoor, outdoor, or undetermined frames. Just as with the classifier associated with step 525, the classifier used in step 540 is a SVM classifier; however, in this case, a linear kernel is selected because the data is approximately linearly separable, and the selection of a linear kernel prevents over-fitting as could occur with the use of a radial basis function kernel. Generally, for a new image (i.e. non-training image), a classification score is calculated during step 540 for each of the three classes associated with the classifier (i.e. indoor, outdoor, and undetermined). Typically, the highest classification score of the three is the type of content most likely associated with the frame, and the frame is labeled accordingly. According to the presently-described embodiment, if the frame is labeled an "outdoor" frame, then it is processed further via the outdoor classification process 600. Otherwise, the frame is assigned an overall classification score of "0" for all outdoor classes and stored in a database 14 for subsequent processing (see step 235 in FIG. 2 and associated discussion).

Still referring to the embodiment of the indoor/outdoor classification process 500 described in FIG. 5, as described, two separate classifiers are used (i.e. classifiers associated with steps 525 and 540) for purposes of, typically, producing more accurate classification results, as such classifiers take into account variations in content across different portions of a frame. It is understood, however, that embodiments of the present system 10 are not limited to a two-classifier approach, and a one-classifier approach may be used (i.e. training a classifier on raw features extracted from an entire image, as opposed to dividing the image into cells) if a system operator is content with (typically) less accurate results.

Outdoor Classification

After a frame has been labeled as an outdoor frame, the frame is analyzed by the outdoor classification process 600 to determine which category or categories of material class(es) (if any) apply to the frame. As described previously and as used herein, "material" or "material class" refers to the type of physical content shown in a frame. According to one embodiment of the present system, materials include building (i.e. the outside of a structure), grass, person, road/sidewalk, rock, sand/gravel/soil, sky/clouds, snow/ice, trees/plants, vehicle, water, and miscellaneous. As will be understood, however, embodiments of the present system are not limited to the particular material classes described, and other similar classes are used according to various embodiments of the present system. As mentioned previously, once each frame in a given video file 22 or portion of a video file has been classified, the material class results are aggregated and averaged via the video file classification process 1000, 1001 to identify one or more scene classes for each video file or portion thereof.

Figure 6:
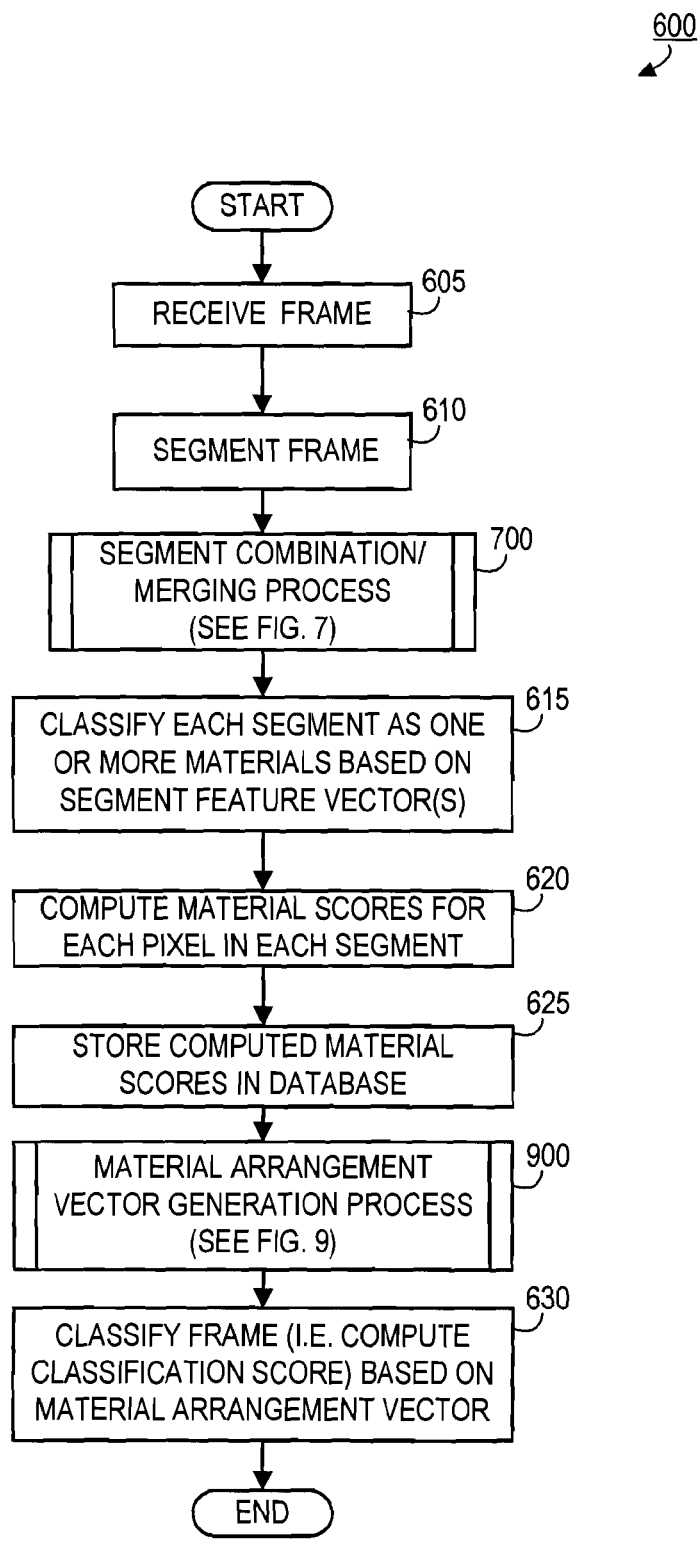
FIG. 6 is a flowchart illustrating the steps and functions involved in the outdoor frame classification process according to one embodiment of the present system.

Referring now to FIG. 6, a flowchart is shown illustrating the steps and functions involved in the outdoor frame classification process 600 according to one embodiment of the present system 10. Generally, the process 600 involves receiving a frame from a video file 22 and segmenting the frame into regions of similar content based on a predetermined segmentation algorithm. Preferably, because segmentation algorithms tend to produce varying results, each frame is segmented multiple times based on multiple sets of parameters (described below). The features from each region for each segmentation are extracted, and each region is classified by material using a hierarchy of SVM classifiers. The material classification results are combined across the multiple segmentations by averaging the classification scores for each material for each pixel in the region. The combination of classification scores results in, for each pixel in the frame, a score for each material category (that sum to 1 for each pixel), with the largest score representing the material category that is most likely associated with each pixel. From these material scores, a material arrangement vector is generated describing the spatial relation of material(s) in a given frame. The material arrangement vector is used to classify the frame based on zero or more scene categories/classes (described below).

Segmentation

As shown in FIG. 6, starting at step 605, a frame is received for classification. At step 610, the frame is divided into segments (i.e. segmented) based on the content shown in each segment. Each separate segment generally comprises an image region with relatively uniform color and texture. The underlying goal of segmentation is to identify and separate image regions that contain different types of content (e.g. different materials) to produce more accurate classification results for the image, and subsequently the video file. According to one embodiment, the segmentation algorithm used is Efficient Graph-Based Segmentation, as described in P. F. Felzenszwalb and D. P. Huttenlocher, Efficient Graph-Based Image Segmentation, International Journal of Computer Vision, vol. 59, no. 2 (2004), which is incorporated herein by reference as if set forth herein in its entirety.

Because segmentation algorithms tend to produce varying results based on the parameters used, multiple segmentations are calculated for each frame according to one embodiment, as suggested in D. Hoiem et al., Geometric Context from a Single Image, International Conference of Computer Vision (ICCV), IEEE, vol. 1, pp. 654-61 (2005); and G. Mori et al., Recovering Human Body Configurations Combining Segmentation and Recognition, In IEEE Computer Vision and Pattern Recognition (2004), both of which are incorporated herein by reference as if set forth herein in their entirety. Preferably, three different segmentations are computed for each frame. Thus, according to a preferred embodiment, for each frame extracted from a video file, three different parameter sets are used in the Efficient Graph-Based Segmentation algorithm, namely $\sigma=0.325$, $k=500$; $\sigma=0.4$, $k=180$; and $\sigma=0.5$, $k=160$, with a minimum segment size of 500 pixels, wherein u is used to smooth the image before segmenting it, and k comprises a value for the threshold function. As will be understood, however, embodiments of the present system are not limited by these particular parameters, nor by use of only three segmentations, and other parameters and multiples of segmentations are used according to various embodiments.

Figure 7:
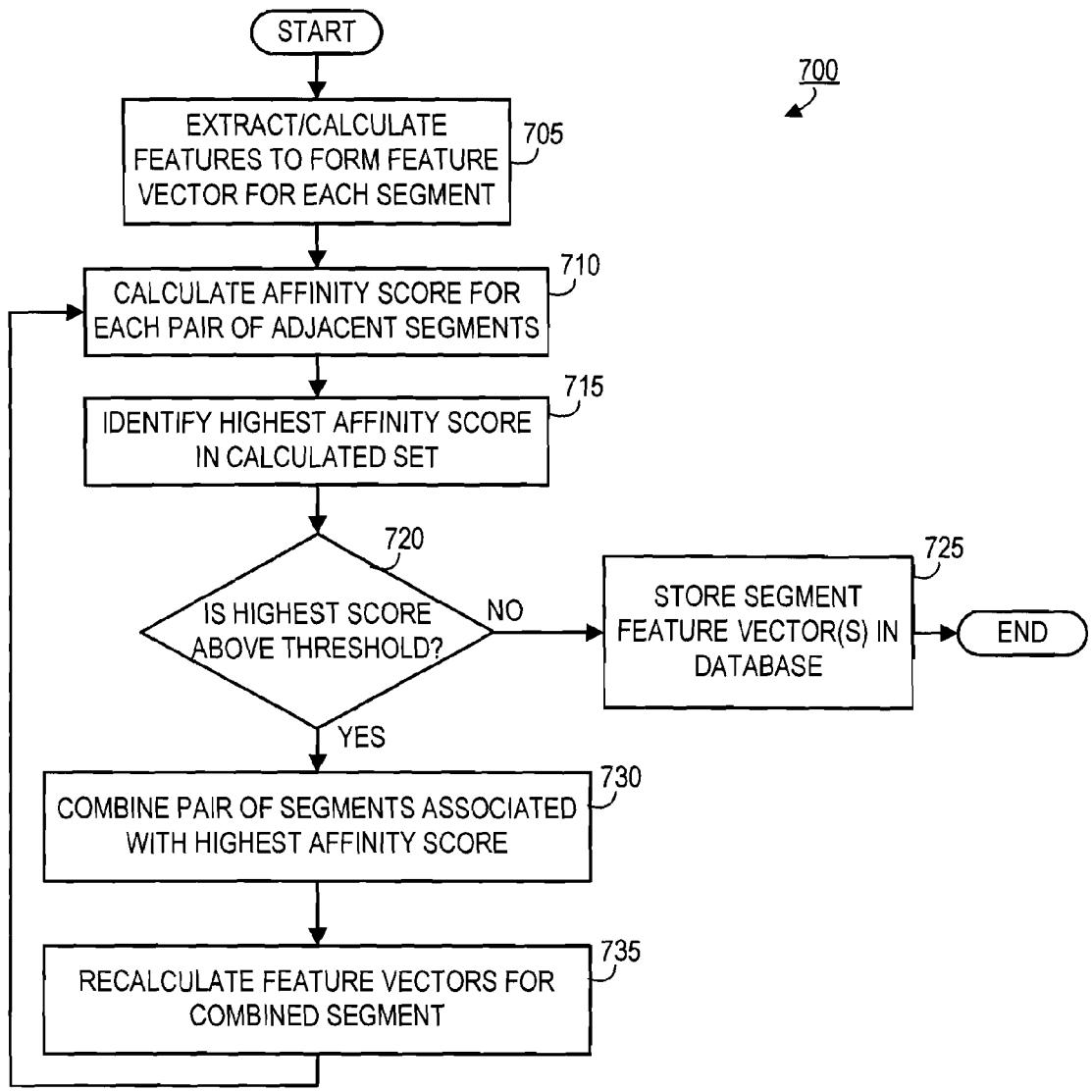
FIG. 7 is a flowchart illustrating an embodiment of the segment combination/merging process for combining like segments.

As will be appreciated, some of the segments produced via the segmentation algorithm (step 610) are small, or may comprise only part of a larger object or region of material. Accordingly, in one embodiment, in order to achieve higher accuracy and faster computation speeds during subsequent material classification, segments including similar classes of materials are merged together. FIG. 7 is a flowchart illustrating an embodiment of the segment combination/merging process 700 for combining like segments in a frame. As mentioned previously, each frame is typically segmented multiple times, producing multiple sets of segments (i.e. segmentations). Thus, as will be understood by one of ordinary skill in the art, the combination/merging process 700 is repeated for each discrete set of segments for each frame (preferably, three sets corresponding to three segmentations).

Starting at step 705, the features are extracted/calculated from each segment to form a feature vector for each segment. According to a preferred embodiment, the extracted features correspond to those mentioned previously (i.e. color, edge, line, texture, and shape), but other features are used in other embodiments. The extracted features are concatenated into a feature vector for the segment. At step 710, an affinity score is calculated for each pair of adjacent segments. As used herein, an "affinity score" is the result/score from an adjacency classifier predicting whether two adjacent segments comprise or belong to the same material class. According to one embodiment, the adjacency classifier comprises a Random Forest classifier that operates on the absolute value of the difference between feature vectors of adjacent segments. Preferably, a Random Forest classifier is used (as opposed to a SVM) classifier to improve computation speed. Generally, in order to train the classifier, the feature vectors of a plurality of adjacent segments in a plurality of training images are compared, and the absolute value of the difference is calculated for each and used as the training feature set for the classifier. Each absolute value vector is labeled by a system operator as a positive result (i.e. the adjacent segments correspond to the same material class) or a negative result (i.e. the adjacent segments correspond to different material classes). Thus, given a pair of adjacent segments from a new frame (i.e. a frame desirous of classification), the affinity score produced by the adjacency classifier of step 710 represents the probability that the two segments include content associated with the same class.

Still referring to FIG. 7, for a new frame, once all affinity scores have been calculated for all pairs of segments in a given segmentation, the highest affinity score is identified (step 715). If the highest affinity score is above a predefined threshold (step 720), then the pair of segments associated with the affinity score are merged into a single segment (step 730). Once merged, the feature vector of the merged segment is recalculated (step 735). Then, based on the newly-defined segment and adjacent segments, the affinity scores are recalculated for each pair of adjacent segments (step 710). Steps 710-735 are repeated until the highest affinity score is no longer above the predefined threshold (i.e. greedy, hill-climbing combination). When this occurs, the most recent set of segment feature vectors (calculated at step 735) are stored in a database 14 for subsequent processing. As will be understood, the segments in some frames do not require combination because they are adequately and accurately segmented during the segmentation step 610 (see FIG. 6). Accordingly, the segment feature vectors initially calculated for these segments at step 705 are stored in the database via step 725, and no further merging or recalculating is necessary.

According to one embodiment, to determine an appropriate affinity score threshold value, the adjacency classifier is calibrated with a validation set of images/frames to produce a desired accuracy. As will be understood, a "validation set" refers to a set of images used to test a classifier that have been labeled by a system operator such that the actual class of each image is known. To determine an appropriate threshold value, a system operator selects an arbitrary value and performs process 700 on a set of validation frames. Because the actual class of each segment is known, the precision value of correct segment combinations can be calculated (i.e. the proportion of combined segments that actually belong to the same class as compared to all combined segments). If the precision is less than the desired precision (e.g. 97%), then the affinity score threshold should be increased (and vice versa). This process should be repeated until a desired precision is reached.

Again, as will be understood, segment combination/merging process 700 is completed for each separate segmentation for each frame. Thus, for example, if a given frame is segmented three times, process 700 is repeated for each of the three segmentations, and the results of each are stored in a database 14.

Material Classification

Referring again to FIG. 6, after each segment has been defined for each of the multiple segmentations for a given frame via steps 605, 610, and the segment combination/merging process 700, the segment feature vectors are used to classify each segment (and subsequently each associated frame) based on a set of predefined material classes (step 615). Before each segment can be classified, however, a set of material classifiers associated with the predefined classes are developed using a plurality of training images. For training purposes, the segment feature vectors for each segment associated with each training image are formed as described previously in association with segment step 610 and combination process 700. These segment feature vectors are labeled according to their respective material classes by a system operator, and the labeled vectors are used to train a hierarchy of SVM classifiers (described in further detail below) (see FIG. 8 for exemplary classifier hierarchy).

According to one embodiment, libSVM (mentioned previously) is used to form a one-to-one classifier for each pair of material classes and produce a classification result as a combination of these classifiers. Generally, each one-to-one classifier comprises a SVM classifier with a radial basis function kernel. Use of such a combination of one-to-one classifiers is conventional for a multi-class problem (i.e. when multiple classes potentially apply to a single image region). For N classes, the number of classifiers required is defined by:

$$\frac{N(N-1)}{2}$$

For example, for an embodiment that includes 12 material classes (e.g. building, grass, person, road/sidewalk, rock, sand/gravel/soil, sky/clouds, snow/ice, trees/plants, vehicle, water, and miscellaneous), 66 classifiers are used to accurately classify each region (i.e. 12(12−1)/2=66). This large number of classifiers is required because each class must be compared against every other class to achieve a complete result.

Figure 8:
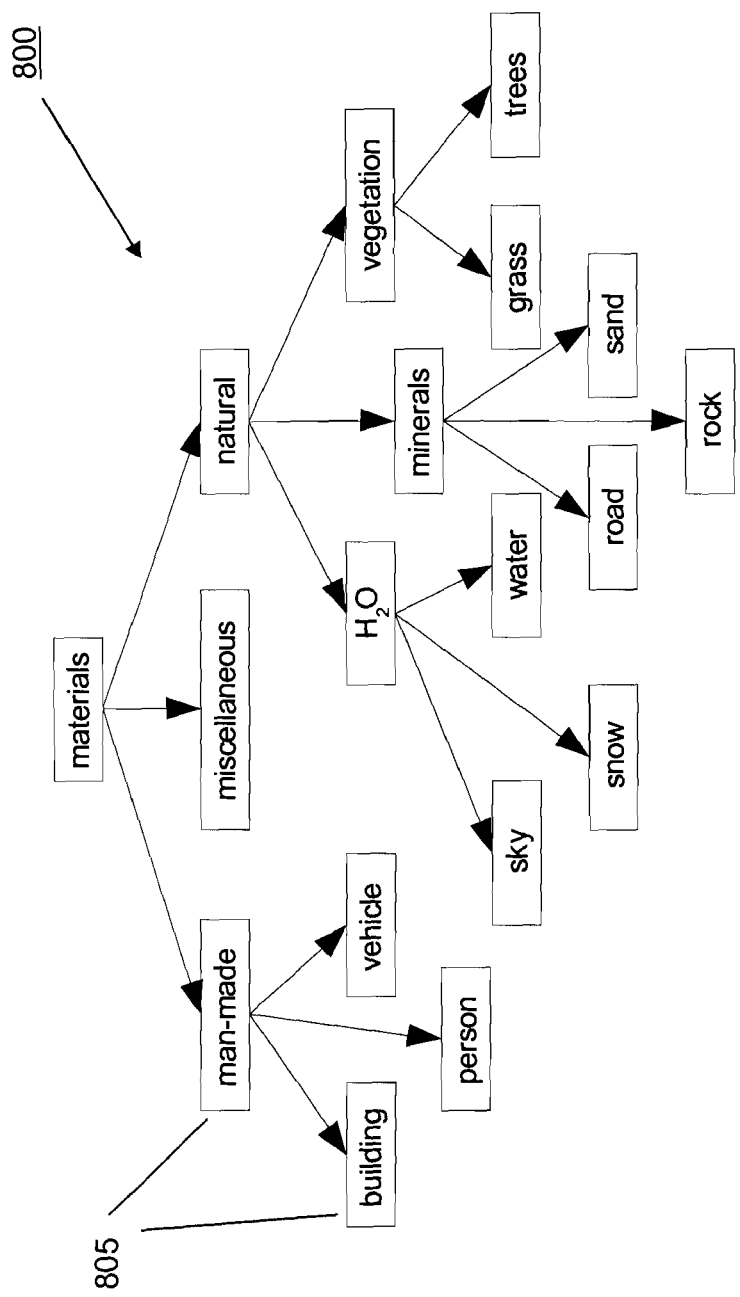
FIG. 8 shows an exemplary hierarchical tree representing an organization of classifiers used to classify image materials.

According to a preferred embodiment, however, rather than a conventional one-to-one classifier arrangement, a hierarchy of classifiers is used. The hierarchy utilizes one-to-one classifiers, but based on predetermined knowledge about the classes (i.e. they are explicitly predefined to correspond to materials), a more effective arrangement of one-to-one classifiers is constructed. FIG. 8 shows an exemplary hierarchical tree representing an organization of classifiers 800 used to classify materials. As shown, each node/box 805 represents a material class or category. The classes are pre-organized based on inherent knowledge about the content of the classes, thus requiring fewer classifiers and computational steps to classify a segment or image region. For example, the categories of "building," "person," and "vehicle" are organized under the "man-made" category. This type of organization presupposes that, based on the particular type of image content, not every class need be compared to every other class. For example, this hierarchy assumes that "vehicle" content does not require comparison to "grass" content, etc. As will be understood, each hierarchy of classifiers is predetermined by a system operator based on the classes of materials used, and the materials and arrangement shown in FIG. 8 are presented for exemplary purposes only, and are not intended to limit the present system 10 in any way.

According to the hierarchical type of arrangement shown in FIG. 8, when only two child classes extend from a parent class, a single one-to-one classifier is sufficient to achieve an accurate result between the two child classes (as defined by the classifier equation above, i.e. 2(2−1)/2=1). For example, the "grass" and "trees" classes in FIG. 8 only use a single one-to-one classifier. When three children exist, three one-to-one classifiers are used (i.e. 3(3−1)/2=3), and so on. For parent classes, training data from all child classes are used to train the associated classifiers (e.g. "building," "person," and "vehicle" data is used to train the "man-made" classifier). Generally, better accuracy and faster computational speeds are achieved using a hierarchical approach as it makes effective use of known data types.

For a hierarchy or tree of classifiers 800 (such as that shown in FIG. 8), a classification result for each segment or image region is produced by multiplying the results of each intermediate classifier down the tree. Specifically, assume CX (f) represents a given classifier result, in the form of a vector comprising a score for each material class, on a node x in the tree and a feature vector f. For leaf nodes (i.e. the nodes with no child nodes extending therefrom, such as "person," "sky," "road," "rock," etc.), the classifier result is defined by:

$$C_x(\vec{f})_i = \begin{cases} 0, & \text{material} \neq x \\ 1, & \text{material} = x \end{cases}$$

For non-leaf nodes (i.e. those nodes with child nodes extending therefrom, such as "man-made," "vegetation," etc.), the classifier result is defined by:

$$C_x(\vec{f}) = \sum_{y \in children(x)} c_x(\vec{f})_y C_y(\vec{f}),$$

where $C_x(\vec{f})$ represents the result of the SVM classifier for given node x, and $C_x(\vec{f})_y$ is the result for given class y. For example, given a segment to be classified, the classification score for the segment for the "building" class comprises the result of the material classifier for "man-made" multiplied by the result of the man-made classifier for "building."

For a new frame (i.e. a frame desirous of classification), the previously-calculated segment feature vectors associated with the frame are retrieved from a database 14 (see FIG. 7 and associated discussion for calculation and storage of segment feature vectors), and processed via a hierarchical material classification tree, such as that shown in FIG. 8 (step 615). Generally, the scores produced for each SVM classifier within the tree sum to 1, and thus the scores produced by the tree for each included class sums to 1, with each material score comprising a value between 0 and 1. The material with the greatest score (i.e. highest decimal value between 0 and 1) represents the material type most likely contained within a given segment. Thus, after being classified by a hierarchical set of material classifiers, each segment is associated with a vector of material scores, wherein the vector includes a value between 0 and 1 for each predefined material class.

Again referring to FIG. 6, based on the vectors of material scores, the material scores for each pixel in a given segment are calculated (step 620). According to one embodiment, the material scores associated with a given segment are assigned to each pixel in the segment. If multiple segmentations are used, the material values for each segmentation are averaged at each pixel to produce a vector of material scores for each pixel. Thus, each pixel is represented by a vector of material scores of N.times.1 dimension, wherein N represents the number of classes, and each material value in the vector represents an average of that material score across each segmentation of the frame. At step 625, the material scores associated with each pixel are stored in a database 14 for subsequent processing.

Material Arrangement Vector

Figure 9:
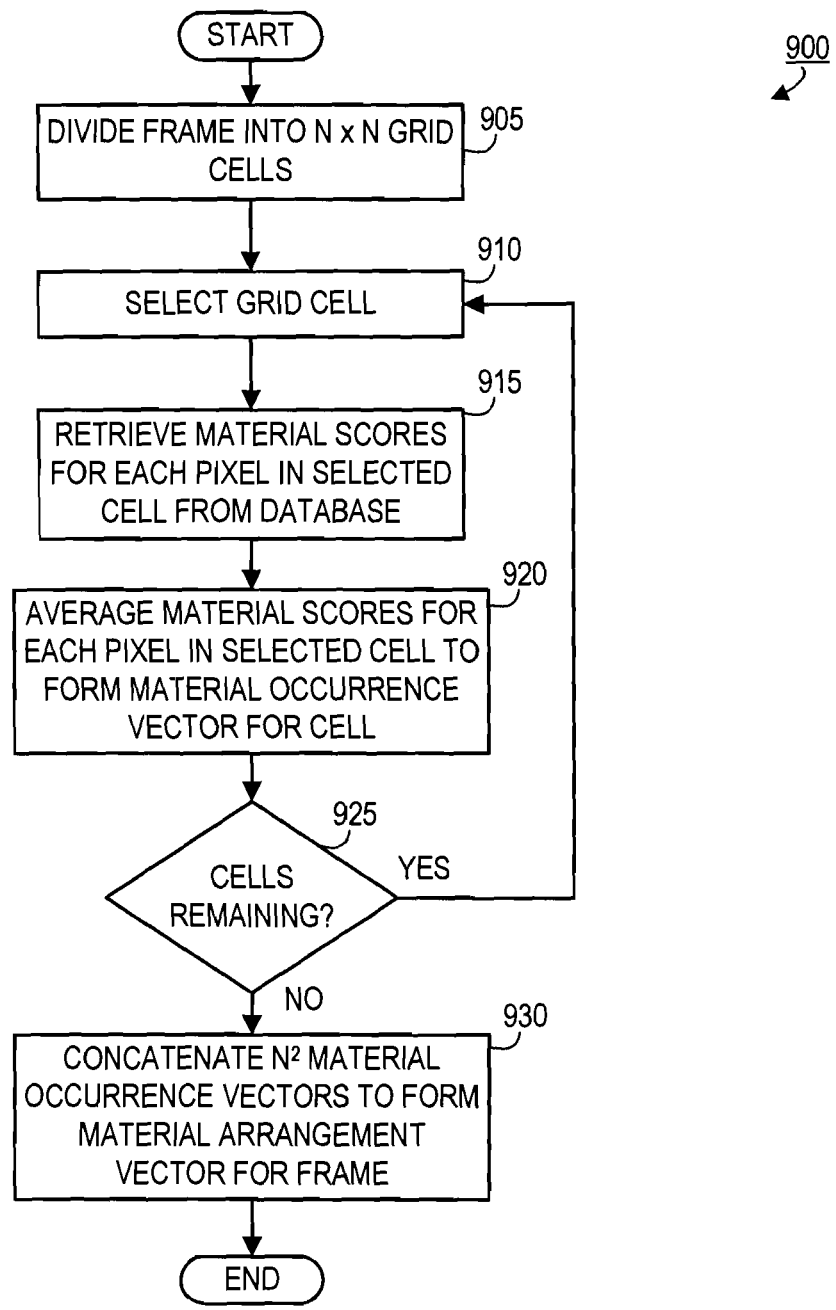
FIG. 9 is a flowchart illustrating the steps associated with an embodiment of the material arrangement vector generation process.

Referring now to FIG. 9, a flowchart is shown illustrating the steps associated with an embodiment of the material arrangement vector generation process 900. Generally, a material arrangement vector defines or characterizes the spatial arrangement of material content in a given frame based on previously-calculated material scores for pixels within the frame. To compute a material arrangement vector for a frame, the frame is first divided into N×N grid cells (step 905). As will be understood, as grid sizes become progressively more finite (e.g. 1×1, 2×2, 4×4, etc.), the material vector comprises a more accurate representation of the spatial arrangement of materials in a frame. For example, if a 1×1 grid size is used, then a resulting material arrangement vector is identical to a material occurrence vector (i.e. the vector describing proportion or occurrence of materials in a given cell or region) for the entire frame, thus indicating the proportion (but not spatial arrangement) of each material in the frame. As progressively more detailed grid sizes are used (e.g. 2×2, 4×4, 8×8, etc.), the spatial arrangement of the materials in the image becomes clearer as each grid cell defines the specific material type(s) contained in the cell, and the resulting class of material for each region in the image becomes known.

Regardless of the grid size used, at step 910, a cell is selected for processing. At step 915, the material scores (i.e. vector of material scores) for each pixel in the selected cell are retrieved from a database 14. The vectors of material scores for each pixel in the cell are averaged to produce a material occurrence vector for the cell (step 920). As described, the material occurrence vector identifies the type(s) of material likely contained in the cell based on the material score for each class of material in the vector. At step 925, the system determines whether any unprocessed cells are remaining in the frame. If so, steps 910-925 are repeated for the next cell. Once the material occurrence vectors have been calculated for all cells in the frame, the occurrence vectors are concatenated to form the material arrangement vector for the frame (step 930). According to one embodiment, material arrangement vector generation process 900 is repeated for a given frame using many different grid sizes, and the resulting material arrangement vectors are used to train varying classifiers, whereby the classification results are averaged to produce more accurate scene classifications.

Scene Classifiers

Referring again to FIG. 6, at step 630, a given frame is classified based on the material arrangement vector for the frame (i.e. a scene classification score vector is calculated for the frame). Each frame is associated with a scene classification score vector comprising classification scores for predefined classes of scenes (e.g. coast/beach, desert, forest, grassland, highway, indoor, lake/river, mountainous, open water, outdoor, sky, snow, urban, etc.). Before such a scene classification score vector can be calculated, however, a classifier must be trained to generate such vectors. Two embodiments of scene classifiers are described below.

Proportional Classifiers

According to one embodiment of the present system 10, a proportional classifier operates on material occurrence vectors (i.e. material arrangement vectors associated with 1.times.1 grid sizes). For a plurality of training images/frames, the material arrangement vectors are calculated for a 1.times.1 grid size according to process 900. These vectors are labeled by a system operator according to the scene class(es) associated with the corresponding frames (based on content). According to one embodiment, more than one scene class may apply to a given frame. Alternatively, some frames include no defined scene classes, and are labeled as such. In one embodiment, each training image is flipped horizontally and the material arrangement vector is recalculated to provide additional training data to each classifier. For each scene type (e.g. coast/beach, desert, etc.), a SVM classifier with a radial basis function kernel is trained based on material arrangement vectors associated with that scene type. Given a new frame, each scene classifier classifies the material arrangement vector associated with the frame to determine a classification score (between 0 and 1) for the frame (i.e. the higher the score, the more likely it is the frame includes that class of content). These classification scores are collected into a scene classification score vector and stored in a database 14 for further video file classification (step 235, see FIG. 2).

Spatial Pyramid Classifiers

According to a preferred embodiment, a spatial pyramid classifier is used to classify frames according to scene types. Examples of spatial pyramids are described in Lazebnik (2006) (cited previously), which is incorporated herein by reference as if set forth herein in its entirety. The spatial pyramid classifiers operate in much the same way as the proportional classifiers (described above), except that each type (i.e. scene class) of classifier is trained using material arrangement vectors associated with varying grid sizes, and the results are combined for each type. Specifically, material arrangement vectors are calculated for each training frame according to process 900 for multiple grid sizes (e.g. 1×1, 2×2, 4×4, etc.). For each grid size, a separate classifier is trained using the resultant material arrangement vectors from the training images for that grid size for each scene type. Accordingly, each scene type includes not one, but a multiple number of classifiers corresponding to multiple grid sizes. For example, if three grid sizes are used for each frame (e.g. 1×1, 2×2, 4×4), then each scene type includes three classifiers. Again, each material arrangement vector for each training frame is labeled by hand by a system operator. Also, according to one embodiment, each training image is flipped horizontally and the material arrangement vector is recalculated to provide additional training data to each classifier.

For a new frame (i.e. a frame desirous of classification), a material arrangement vector is calculated for each grid size in which the classifiers have been trained. Thus, during scene classification (step 630), a scene classification score vector is generated for each grid size for each frame. According to one embodiment, a weighted sum of the scene classification score vectors is produced to define a scene classification score vector for the frame. For example, if three different grid sizes are used corresponding to 1×1, 2×2, and 4×4 grid cells, the results for each size are weighted and combined (e.g. weighting of 0.25 for 1×1, 0.25 for 2×2, and 0.5 for 4×4). Thus, the scene classification score values for the 1×1 grid size are multiplied by 0.25, the values for the 2×2 grid size are multiplied by 0.25, and the values for the 4×4 grid size are multiplied by 0.5, whereby the resulting weighted values are added together to produce a scene classification score vector for the given frame. Generally, a higher weight is associated with higher grid sizes because those sizes are typically more accurate (although this is not always the case). As will be understood and appreciated by one of ordinary skill in the art, a variety of multiples of grid sizes, number of grid cells used, and weights associated with the grid sizes are used according to various embodiments of the present system.

Video File Classification

Referring again to FIG. 2, after the scene classification scores (i.e. scene classification score vectors) have been calculated for each processed frame in the video file, the video file itself is classified according to one embodiment of the video file classification processes 1000, 1001. Generally, two different types of video file classification processes 1000, 1001 are used depending on the type of video file received, as well as the purpose of the classification.

Predefined Shot

Figure 10A:
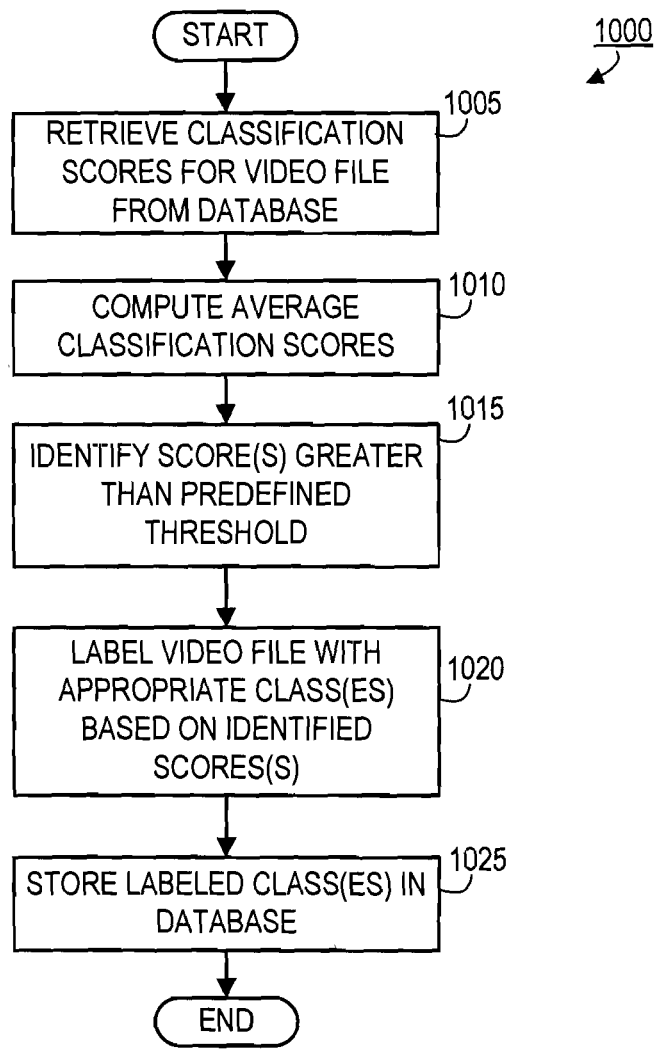
FIG. 10A is a flowchart illustrating the steps involved according to one embodiment of the video file classification process for a predefined shot.

FIG. 10A is a flowchart illustrating the steps involved in one embodiment of the video file classification process 1000 for a predefined shot. Classification process 1000 is used when the received video file comprises a predefined shot, or a sequence of predefined shots with clearly defined start and end timecodes, or an entire video with clearly defined start and end timecodes. Thus, the overall purpose of process 1000 is to classify a portion of video that is already divided into a discrete unit (e.g. via the process described in Rasheed (2003), cited previously). As will be understood, if a video file includes more than one discrete unit (e.g. a plurality of shots), each of the units is analyzed and classified separately, providing a classification score/result for each separate unit.

Starting at step 1005, the scene classification score vectors for each frame in the video file, shot, or other discrete unit of video are retrieved from the database 14. For frames that were classified as "indoor" or "undetermined," the classification score of "0" for outdoor classes (i.e. a vector of zero values corresponding to each outdoor scene class) is retrieved for those frames. At step 1010, the classification scores for each scene class for each frame are averaged across all frames in the given unit of video (i.e. shot). For "indoor" or "undetermined" frames, the "0" value is used in the average calculation for each outdoor scene class for that particular frame, thus lowering the overall average for the shot. The average scene class scores produce a final classification score for each scene class for the shot (an example of which is shown in table 26a in FIG. 1). As shown in exemplary output 26a, a classification score is provided for each scene class, with the higher scores indicating a higher likelihood that a given shot includes content associated with the identified scene class. As will be understood and appreciated, rather than averaging the scene classification scores, the scores are analyzed in other intelligent ways according to various embodiments of the present system, such as examining a median or maximum value, using signal processing across an entire video file, etc.

Generally, a predefined threshold value is set by a system operator for each scene class, and any class with a classification score exceeding that threshold is deemed as applying to the shot (step 1015). According to one embodiment, the threshold value is determined on a per-class basis (because different classes often perform differently based on the type of classified content), and such thresholds are determined as a function of precision and recall accuracy experiments using validation data. Once the class(es) with classification scores exceeding the threshold are identified, the shot is labeled according to the identified scene classes (step 1020). If none of the classification scores exceed a threshold, then no defined scene classes are associated with the shot (likely indicating the shot comprises some other undetermined content). The classification results are then stored in a database 14 for subsequent purposes (step 1025), including generating reports (step 245, see FIG. 2), indexing and retrieval, and other subsequent purposes as will occur to one of ordinary skill in the art.

Shot Detection

Figure 10B:
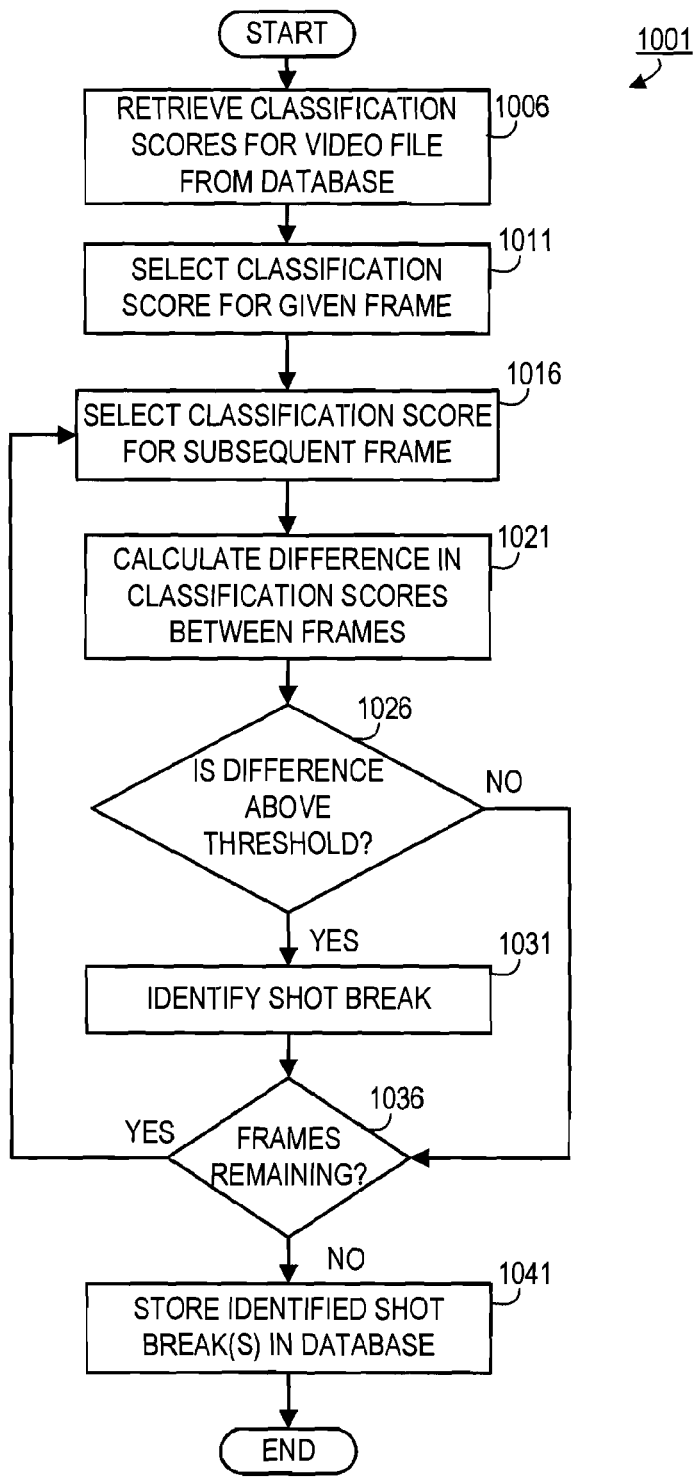
FIG. 10B is a flowchart illustrating the steps involved according to one embodiment of the video file classification process for shot detection.

According to one embodiment, rather than labeling predefined shots or sequences of video, the video classification process 1001 is used to detect shot breaks in a video file or sequence of frames. Accordingly, FIG. 10B is a flowchart illustrating the steps involved in one embodiment of the video file classification process 1000 for shot detection. Starting at step 1006 the scene classification score vectors for each frame in the video file are retrieved from the database 14. At step 1011, a classification score vector for a given frame is selected from the retrieved set. Typically, the first vector selected is the vector associated with the first processed frame in the file, although this is not necessarily the case. Regardless of which vector is selected, at step 1016, a classification score vector associated with a subsequent frame in the video file is selected. Typically, the subsequent classification score vector will be for the next processed frame in the sequence of frames in the video file, although this is not necessarily the case.

At step 1021, the absolute value of the difference between the scene class scores in the two selected classification score vectors are calculated. For example, if the vector for the first selected frame includes a classification score for class "forest" of 0.11, and the vector for the second selected frame includes a classification score for class "forest" of 0.13, then the absolute value of the difference would be 0.02. If this difference is above a predetermined threshold, then a shot break is identified between the two frames (step 1026, 1031). The absolute value of the difference is calculated for each scene class for each vector, and each difference is compared to a predefined threshold. Typically, a large difference in classification scores between two frames indicates a change in content between the two frames, and accordingly, a shot break. If the difference is below a predefined threshold value, then no shot break is identified, and the system determines whether any frames remain in the video file (step 1036). If frames are remaining, then a classification score vector associated with a subsequent frame in the video file sequence is selected and compared to a vector for a previously-selected frame that precedes it. Accordingly, steps 1016, 1021, 1026, 1031, and 1036 are repeated until all scene classification score vectors associated with a given video file have been analyzed. Once all frames have been analyzed, all identified shot breaks (if any) are stored in a database 14 for further reporting (e.g. table 26*b*) and processing purposes.

As will be understood and as mentioned previously, the particular scene classes identified in output 26*a* and listed herein are presented for illustrative purposes only, and are in no way intended to limit the scope of the present systems and methods. Additionally, the exemplary outputs 26*a*, 26*b* are presented for purposes of illustration only, and other types and formats of outputs and reports are generated according to various embodiments of the present system.

Figure 11:
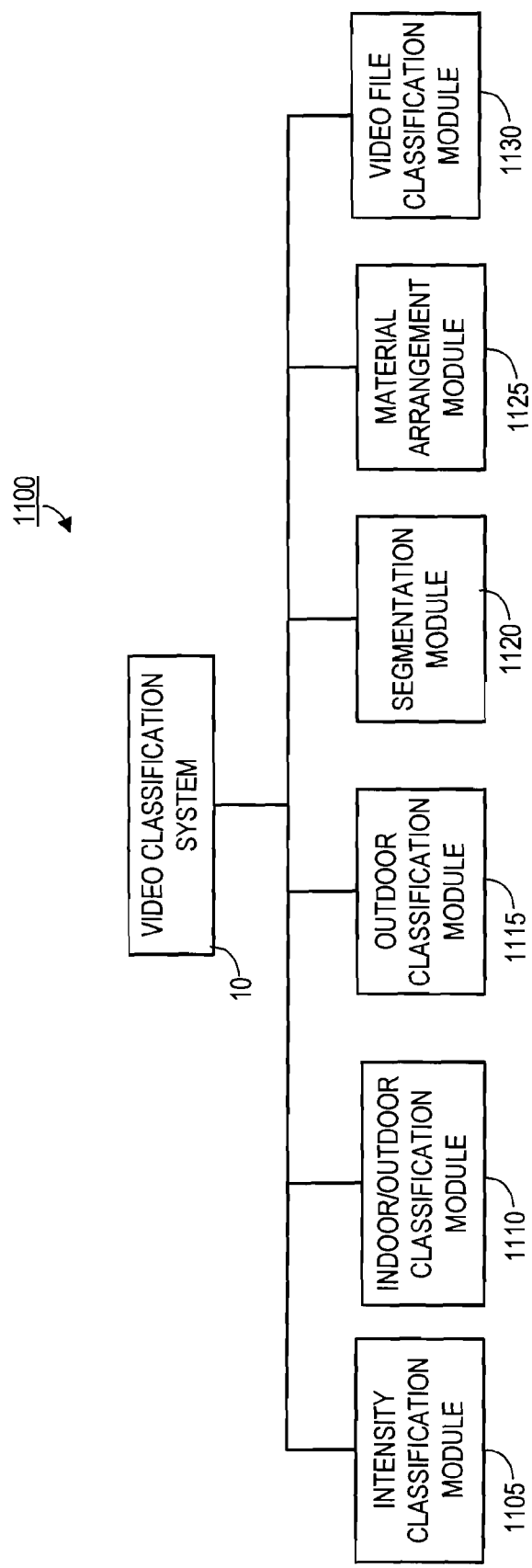
FIG. 11 shows a representation of the system components according to one embodiment of the video classification system.

Referring now to FIG. 11, a representation of the system components 1100 is shown according to one embodiment of the video classification system 10. According to one embodiment, the previously-described processes and functions of the video classification system 10 are performed by the internal system components/modules 1100 shown in FIG. 11. As shown, the system modules include an intensity classification module 1105, an indoor/outdoor classification module 1110, an outdoor classification module 1115, a segmentation module 1120, a material arrangement module 1125, and a video file classification module 1130. As will be understood and appreciated, the components or modules shown in FIG. 11 are presented for illustrative purposes only, and are not intended to limit the scope of the present systems or methods in any way.

Experimental Results

To demonstrate functional capability, an embodiment of the present system was tested to determine its classification performance and accuracy. The embodiment tested was configured to detect and classify video content according to outdoor material and scene classes as described above. The video content and associated images used to test the embodiment were obtained from the LabelMe database, as described in B. C. Russell et al., *LabelMe: A Database and Web-Based Tool for Image Annotation, International Journal of Computer Vision*, vol. 77, pp. 157-73 (2008), which is incorporated herein by reference as if set forth in its entirety, as well as from Google®, Images, Flickr®, movies such as *Along Came Polly, Babel, Cheaper by the Dozen, Tears of the Sun*, and *Wild Hogs*, and an episode of the television program Lost.

Material Classification Results

Figure 12:
FIG. 12 shows a confusion matrix of experimental material classification results for correctly classified and misclassified images according to one, tested embodiment of the present system.

For the test, 1019 images (i.e. frames) were extracted from the above-referenced image and video databases, movies, and television program. Five-fold cross-validation was used to test the images, in which 80% of the images are used as training data and 20% are used as validation data (i.e. used to test the results). This process was performed five times until all images had been used as validation data, and the results were averaged over the five tests. The images were processed and segmented as described above (see FIGS. 2-7 and associated discussion), and each segment was hand-labeled as one of the materials shown in the confusion matrix 1200 in FIG. 12 (i.e. building, grass, person, road/sidewalk, rock, sand/gravel, sky/clouds, snow/ice, trees/bushes, vehicle, water, and miscellaneous).

The confusion matrix 1200 demonstrates the percentage of time that a region labeled by the tested embodiment of the system as a given material was correctly labeled as that material as compared to the hand-labeled region, as well as the percentage of time the tested embodiment incorrectly classified a region as another material. For example, as shown in the confusion matrix, the tested embodiment correctly labeled image regions/segments that included content of buildings as "buildings" 69% of the time. As shown, the most accurately classified material was "sky/clouds" (i.e. correctly classified 95% of the time), and the most common misclassification was "snow/ice," which was incorrectly classified as "water" 25% of the time. By analyzing a confusion matrix and adjusting threshold values, a system operator is able to customize the results based on his or her performance requirements.

Scene Classification Results (Individual Images)

For the test, 10017 images (i.e. frames) were extracted from the above-referenced image and video databases, movies, and television program. Five-fold cross-validation was again used to test the images, in which 80% of the images are used as training data and 20% are used as validation data (i.e. used to test the results). This process was performed five times until all images had been used as validation data, and the results were averaged over the five tests. The images were processed as described above (see FIGS. 2-9 and associated discussion). Each image was hand-labeled according to a corresponding scene class or classes, as listed in FIG. 12 (i.e. urban, coast/beach, desert, forest, grassland, highway, lake/river, mountainous, sky, snow, open water, indoor, and outdoor). Additionally, each image was labeled according to more than one class if more than one type of scene content was present in the image.

Figure 13:
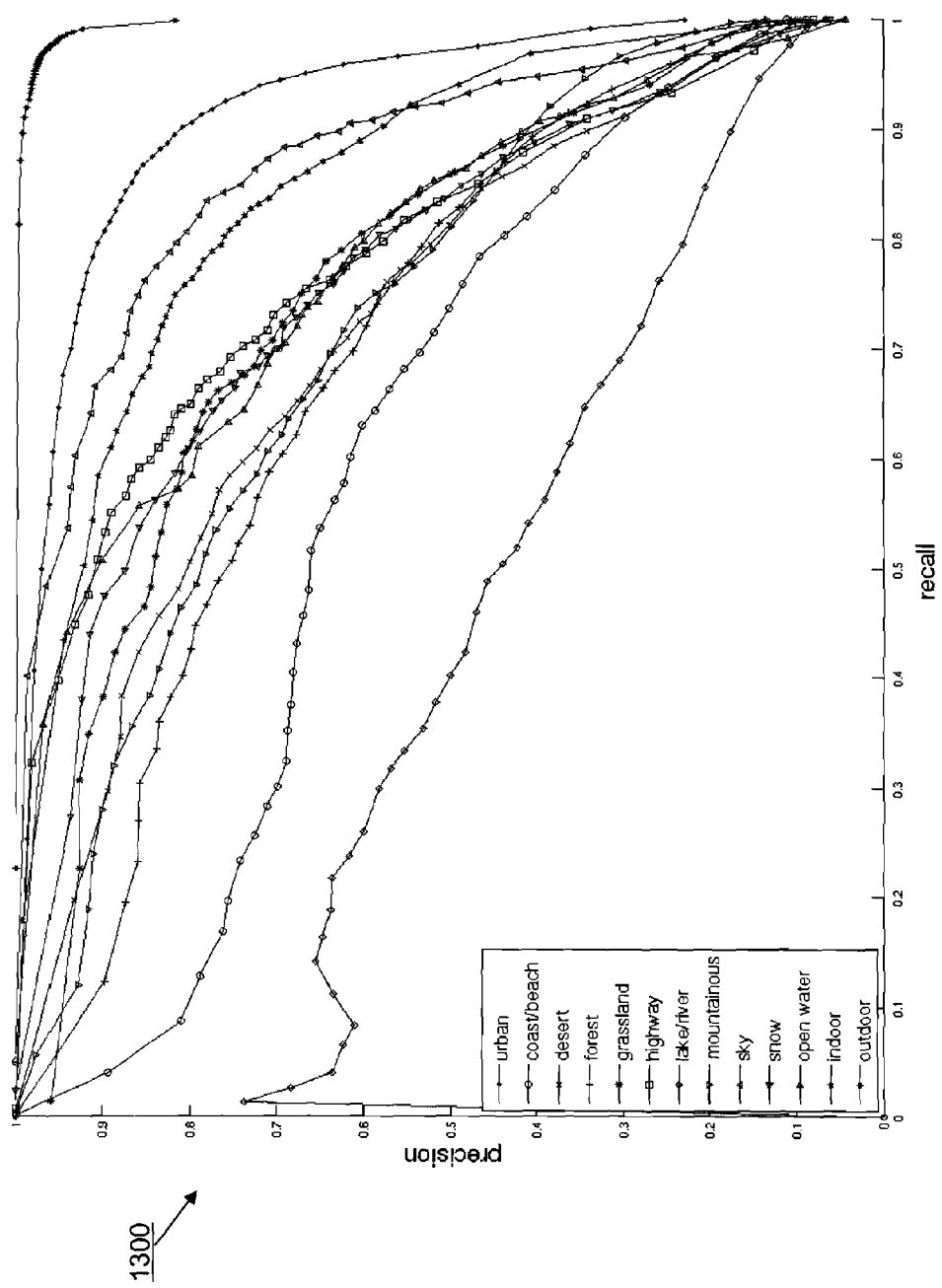
FIG. 13 is a precision-recall curve of experimental scene classification results illustrating precision and recall values for tested images for various thresholds according to one, tested embodiment of the present system.

As used herein, "precision" represents the percentage of correctly classified images from all classified images (i.e. the fraction of detections that are true positives rather than false positives). As used herein, "recall" represents the percentage of correctly classified images from all images (i.e. the fraction of true labels that are detected rather than missed). The precision-recall curve 1300 shown in FIG. 13 represents the plotted precision and recall results for each scene class as scene classification threshold values are varied between 0 and 1 in increments of 0.01 (i.e. this demonstrates the trade-off between accuracy and noise). Each point in the curve 1300 represents the computed precision and recall scores for a particular threshold value.

As shown in FIG. 13, of the outdoor classes, the "urban" category achieved the greatest accuracy. This is likely due, in part, to the large volume of training images available for the "urban" category. This result demonstrates that when many training images are used, embodiments of the present system are capable of classifying images with high accuracy. As also shown, the "lake/river" category produced the poorest results. This result is somewhat expected, however, because reflections of surrounding terrain onto small bodies of water in images often produces confusing colors and spatial arrangements, creating difficulty in classification.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A method, comprising:
  receiving a video file comprising a plurality of frames, each frame of the plurality of frames associated with a plurality of scene classification scores, each scene classification score of the plurality of scene classification scores representing a probability that a respective frame includes content associated with a scene category of a plurality of scene categories;
  determining, based on analyzing the plurality of scene classification scores associated with one or more frames of the plurality of frames, a start time and an end time of each scene of a plurality of scenes;
  for at least one scene of the plurality of scenes:
    determining that one or more frames from the at least one scene includes content associated with one or more scene categories;
    assigning, based on the one or more scene categories associated with the one or more frames, one or more scene categories from the plurality of scene categories to the at least one scene;
  storing, in one or more indexes, data indicating (a) the one or more scene categories assigned to the at least one scene of the plurality of scenes, and (b) a start time and an end time for the at least one scene of the plurality of scenes.

2. The method of claim 1, further comprising:
  receiving a search query specifying one or more particular scene categories;
  responding to the search query with one or more scene results, each scene result of the one or more scene results associated with at least one of the one or more particular scene categories.

3. The method of claim 1, further comprising:
  extracting a set of frames from the at least one scene;
  in response to determining that one or more particular frames from the set of frames comprises a poor classification frame, removing the one or more particular frames from the set of frames.

4. The method of claim 1, further comprising:
  extracting a set of frames from the at least one scene;
  in response to determining that one or more particular frames from the set of frames comprises a poor classification frame, removing the one or more particular frames from the set of frames;
  wherein one or more particular frames are determined to comprise a poor classification frame based on one or more classifiers.

5. The method of claim 1, further comprising:
  generating the plurality of scene classification scores for each frame of the plurality of frames;
  wherein determining that one or more frames from the at least one scene includes content associated with one or more scene categories is based on one or more classifiers;
  wherein the one or more classifiers comprise a spatial pyramid of classifiers, and wherein varying weights are associated with the plurality of scene classification scores.

6. The method of claim 1, further comprising:
  dividing each frame of the plurality of frames into one or more segments, each segment including relatively uniform image content;
  extracting image features from each segment to form a feature vector associated with each segment;
  generating a material classification score vector for each segment via one or more material classifiers based on the feature vector associated with each segment, wherein each material classification score vector includes one or more material classification scores associated with one or more material content categories.

7. The method of claim 1, further comprising:
  dividing each frame of the plurality of frames into one or more segments, each segment including relatively uniform image content;
  extracting image features from each segment to form a feature vector associated with each segment;
  generating a material classification score vector for each segment via one or more material classifiers based on the feature vector associated with each segment, wherein each material classification score vector includes one or more material classification scores associated with one or more material content categories;
  wherein the one or more material content categories include one or more of:
    building, grass, person, road/sidewalk, rock, sand/gravel/soil, sky/clouds, snow/ice, trees/plants, vehicle, water, and miscellaneous.

8. The method of claim 1, further comprising:
  dividing each frame of the plurality of frames into one or more segments, each segment including relatively uniform image content;
  extracting image features from each segment to form a feature vector associated with each segment;
  generating a material classification score vector for each segment via one or more material classifiers based on the feature vector associated with each segment, wherein each material classification score vector includes one or more material classification scores associated with one or more material content categories;
  wherein each of the one or more material classification scores represents a probability that a frame includes content associated with each of the respective material content categories.

9. The method of claim 1, wherein the one or more scene categories includes one or more of: coast/beach, desert, forest, grassland, highway, indoor, lake/river, mountainous, open water, outdoor, sky, snow, and urban.

10. One or more non-transitory storage media storing instructions which, when executed by one or more computing devices, cause:
  receiving a video file comprising a plurality of frames, each frame of the plurality of frames associated with a plurality of scene classification scores, each scene classification score of the plurality of scene classification scores representing a probability that a respective frame includes content associated with a scene category of a plurality of scene categories;
  determining, based on analyzing the plurality of scene classification scores associated with one or more frames of the plurality of frames, a start time and an end time of each scene of a plurality of scenes;
  for at least one scene of the plurality of scenes:
    determining that one or more frames from the at least one scene includes content associated with one or more scene categories;

assigning, based on the one or more scene categories associated with the one or more frames, one or more scene categories from the plurality of scene categories to the at least one scene;

storing, in one or more indexes, data indicating (a) the one or more scene categories assigned to the at least one scene of the plurality of scenes, and (b) a start time and an end time for the at least one scene of the plurality of scenes.

11. The one or more non-transitory storage media of claim 10, wherein the instructions, when executed by the one or more computing devices, further cause:

receiving a search query specifying one or more particular scene categories;

responding to the search query with one or more scene results, each scene result of the one or more scene results associated with at least one of the one or more particular scene categories.

12. The one or more non-transitory storage media of claim 10, wherein the instructions, when executed by the one or more computing devices, further cause:

extracting a set of frames from the at least one scene;

in response to determining that one or more particular frames from the set of frames comprises a poor classification frame, removing the one or more particular frames from the set of frames.

13. The one or more non-transitory storage media of claim 10, wherein the instructions, when executed by the one or more computing devices, further cause:

extracting a set of frames from the at least one scene;

in response to determining that one or more particular frames from the set of frames comprises a poor classification frame, removing the one or more particular frames from the set of frames;

wherein one or more particular frames are determined to comprise a poor classification frame based on one or more classifiers.

14. The one or more non-transitory storage media of claim 10, wherein the instructions, when executed by the one or more computing devices, further cause:

generating the plurality of scene classification scores for each frame of the plurality of frames;

wherein determining that one or more frames from the at least one scene includes content associated with one or more scene categories is based on one or more classifiers;

wherein the one or more classifiers comprise a spatial pyramid of classifiers, and wherein varying weights are associated with the plurality of scene classification scores.

15. The one or more non-transitory storage media of claim 10, wherein the instructions, when executed by the one or more computing devices, further cause:

dividing each frame of the plurality of frames into one or more segments, each segment including relatively uniform image content;

extracting image features from each segment to form a feature vector associated with each segment;

generating a material classification score vector for each segment via one or more material classifiers based on the feature vector associated with each segment, wherein each material classification score vector includes one or more material classification scores associated with one or more predefined material content categories.

16. The one or more non-transitory storage media of claim 10, wherein the instructions, when executed by the one or more computing devices, further cause:

dividing each frame of the plurality of frames into one or more segments, each segment including relatively uniform image content;

extracting image features from each segment to form a feature vector associated with each segment;

generating a material classification score vector for each segment via one or more material classifiers based on the feature vector associated with each segment, wherein each material classification score vector includes one or more material classification scores associated with one or more material content categories;

wherein the one or more material content categories include one or more of:

building, grass, person, road/sidewalk, rock, sand/gravel/soil, sky/clouds, snow/ice, trees/plants, vehicle, water, and miscellaneous.

17. The one or more non-transitory storage media of claim 10, wherein the instructions, when executed by the one or more computing devices, further cause:

dividing each frame of the plurality of frames into one or more segments, each segment including relatively uniform image content;

extracting image features from each segment to form a feature vector associated with each segment;

generating a material classification score vector for each segment via one or more material classifiers based on the feature vector associated with each segment, wherein each material classification score vector includes one or more material classification scores associated with one or more material content categories;

wherein each of the one or more material classification scores represents a probability that a frame includes content associated with each of the respective material content categories.

18. The one or more non-transitory storage media of claim 10, wherein the one or more scene categories includes one or more of: coast/beach, desert, forest, grassland, highway, indoor, lake/river, mountainous, open water, outdoor, sky, snow, and urban.

19. An apparatus comprising:

a subsystem, implemented at least partially in hardware, that receives a video file comprising a plurality of frames, each frame of the plurality of frames associated with a plurality of scene classification scores, each scene classification score of the plurality of scene classification scores representing a probability that a respective frame includes content associated with a scene category of a plurality of scene categories;

a subsystem, implemented at least partially in hardware, that determines, based on analyzing the plurality of scene classification scores associated with one or more frames of the plurality of frames, a start time and an end time of each scene of a plurality of scenes;

a subsystem, implemented at least partially in hardware, that for at least one scene of the plurality of scenes:

determines, that one or more frames from the at least one scene includes content associated with one or more assigns, based on the one or more scene categories associated with the one or more frames, one or more scene categories from the plurality of scene categories to the at least one scene;

a subsystem, implemented at least partially in hardware, that stores, in one or more indexes, data indicating (a) the one or more scene categories assigned to the at least one scene of the plurality of scenes, and (b) a start time and an end time for the at least one scene of the plurality of scenes.

20. The apparatus of claim 19, further comprising:
a subsystem, implemented at least partially in hardware, that receives a search query specifying one or more particular scene categories;
a subsystem, implemented at least partially in hardware, that responds to the search query with one or more scene results, each scene result of the one or more scene results associated with at least one of the one or more particular scene categories.

21. The apparatus of claim 19, further comprising:
a subsystem, implemented at least partially in hardware, that extracts a set of frames from the at least one scene;
a subsystem, implemented at least partially in hardware, that in response to determining that one or more particular frames from the set of frames comprises a poor classification frame, removes the one or more particular frames from the set of frames.

22. The apparatus of claim 19, further comprising:
a subsystem, implemented at least partially in hardware, that extracts a set of frames from the at least one scene;
a subsystem, implemented at least partially in hardware, that in response to determining that one or more particular frames from the set of frames comprises a poor classification frame, removes the one or more particular frames from the set of frames;
wherein one or more particular frames are determined to comprise a poor classification frame based on one or more classifiers.

23. The apparatus of claim 19, further comprising:
a subsystem, implemented at least partially in hardware, that generates the plurality of scene classification scores for each frame of the plurality of frames;
wherein determining that one or more frames from the at least one scene includes content associated with one or more scene categories is based on one or more classifiers;
wherein the one or more classifiers comprise a spatial pyramid of classifiers, and wherein varying weights are associated with the plurality of scene classification scores.

24. The apparatus of claim 19, further comprising:
a subsystem, implemented at least partially in hardware, that divides each frame of the plurality of frames into one or more segments, each segment including relatively uniform image content;
a subsystem, implemented at least partially in hardware, that extracts image features from each segment to form a feature vector associated with each segment;
a subsystem, implemented at least partially in hardware, that generates a material classification score vector for each segment via one or more material classifiers based on the feature vector associated with each segment, wherein each material classification score vector includes one or more material classification scores associated with one or more material content categories.

25. The apparatus of claim 19, further comprising:
a subsystem, implemented at least partially in hardware, that divides each frame of the plurality of frames into one or more segments, each segment including relatively uniform image content;
a subsystem, implemented at least partially in hardware, that extracts image features from each segment to form a feature vector associated with each segment;
a subsystem, implemented at least partially in hardware, that generates a material classification score vector for each segment via one or more material classifiers based on the feature vector associated with each segment, wherein each material classification score vector includes one or more material classification scores associated with one or more material content categories;
wherein the one or more material content categories include one or more of:
building, grass, person, road/sidewalk, rock, sand/gravel/soil, sky/clouds, snow/ice, trees/plants, vehicle, water, and miscellaneous.

26. The apparatus of claim 19, further comprising:
a subsystem, implemented at least partially in hardware, that divides each frame of the plurality of frames into one or more segments, each segment including relatively uniform image content;
a subsystem, implemented at least partially in hardware, that extracts image features from each segment to form a feature vector associated with each segment;
a subsystem, implemented at least partially in hardware, that generates a material classification score vector for each segment via one or more material classifiers based on the feature vector associated with each segment, wherein each material classification score vector includes one or more material classification scores associated with one or more predefined material content categories;
wherein each of the one or more material classification scores represents a probability that a frame includes content associated with each of the respective material content categories.

27. The apparatus of claim 19, wherein the one or more scene categories includes one or more of: coast/beach, desert, forest, grassland, highway, indoor, lake/river, mountainous, open water, outdoor, sky, snow, and urban.

* * * * *